(12) United States Patent
  Khulusi

(10) Patent No.: US 7,955,081 B2
(45) Date of Patent: * Jun. 7, 2011

(54) METHODS AND SYSTEMS FOR PRODUCING FACES OF N-DIMENSIONAL FORMS

(75) Inventor: Basimah Khulusi, Kansas City, MO (US)

(73) Assignee: Basimah Khulusi MD, LLC, Kansas City, MO (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/259,736

(22) Filed: Oct. 28, 2008

(65) Prior Publication Data

US 2010/0064501 A9  Mar. 18, 2010

Related U.S. Application Data

(63) Continuation-in-part of application No. 11/283,636, filed on Nov. 21, 2005, now Pat. No. 7,479,012.

(60) Provisional application No. 60/629,992, filed on Nov. 22, 2004, provisional application No. 60/632,558, filed on Dec. 2, 2004, provisional application No. 60/635,878, filed on Dec. 14, 2004.

(51) Int. Cl.
  *G09B 23/02* (2006.01)

(52) U.S. Cl. ........................................ 434/188

(58) Field of Classification Search .......... 434/81, 434/82, 85, 135, 188, 211, 215, 216, 276, 434/300; 345/420

See application file for complete search history.

(56) References Cited

U.S. PATENT DOCUMENTS

| 185,889 A | 1/1877 | Booman |
| 1,050,596 A | 1/1913 | Bacon |
| 1,081,207 A | 12/1913 | Cahill |
| 2,393,676 A | 1/1946 | Buckminster |
| 5,838,332 A | 11/1998 | Penna et al. |
| 6,556,198 B1 | 4/2003 | Nishikawa |
| 6,816,819 B1 | 11/2004 | Loveland |
| 6,867,772 B2 | 3/2005 | Kotcheff et al. |
| 6,952,204 B2 | 10/2005 | Baumberg et al. |

OTHER PUBLICATIONS

Haben, Nils, "Elastic Surface Nets—Three-Dimensional Reconstruction of Medical Imaging Data," Surgical Systems Laboratory Research Center, pp. 1-81, 2001.
Liu, Wei-zhong, et al., "An Adaptive Algorithm of Automatic Implementing Fillet Operations With Loop Subdivision Surfces," Proceedings of SPIE, vol. 4756, pp. 87-97, 2003.
Sun, Julie, "Folding Orthogonal Polyhedra," A Thesis Presented to the University of Waterloo, Waterloo, Ontario, Canada, pp. 1-44, 1999.
"Polymod Polyhedron Modeler" Apr. 28, 2001 [retrieved online Mar. 19, 2008].
Select file history from related U.S. Appl. No. 11/283,636, dated Mar. 28, 2008 through Dec. 15, 2008, 62 pages.

*Primary Examiner* — Kurt Fernstrom
(74) *Attorney, Agent, or Firm* — Lathrop & Gage LLP

(57) ABSTRACT

Methods and systems are disclosed herein for producing polyhedral nets and faces of N-dimensional forms and for creating polyhedrons. In one embodiment, a system utilizes the methods set forth herein to construct polyhedral nets and outputs results through a display or printer, either in part or in whole.

10 Claims, 15 Drawing Sheets

METHODS AND SYSTEMS FOR PRODUCING FACES OF N-DIMENSIONAL FORMS

RELATED APPLICATIONS

This application is a Continuation In Part of U.S. patent application Ser. No. 11/283,636, filed Nov. 21, 2005, now U.S. Pat. No. 7,479,012, which claims priority to U.S. Patent Application Ser. No. 60/629,992, filed Nov. 22, 2004; U.S. Patent Application Ser. No. 60/632,558, filed Dec. 2, 2004; and U.S. Patent Application Ser. No. 60/635,878, filed Dec. 14, 2004, the disclosures of which are incorporated herein by reference.

BACKGROUND

Polyhedral nets are flat compositions of polygons capable of being cut and folded along prescribed lines and joined at their edges to form polyhedral solids. A polyhedral net shows both an outline of the polyhedral and fold lines for the polyhedral.

It is generally agreed that *Underweysung der Messung* by Albrecht Dürer (1471-1528) presents the earliest known examples of polyhedral nets. This was clearly an extension of the renaissance idea that polyhedra are models worthy of an artist's attention, and the two-dimensional representation of polyhedra was seen as one of the main problems of perspective geometry in Dürer's time. Further, Dürer produced an engraving, *Melencolia I*, in 1514 that includes an uncommon polyhedron which has since been the topic of serious discussion, mathematical interest, and various reconstruction attempts.

Erwin Panofsky, a German-American art historian and essayist, described Dürer's polyhedron as a "truncated rhomboid". According to Panofsky, the polyhedron is simply a cube or rhombohedron which has been truncated at the upper vertex and possibly the lower vertex. If the polyhedron is not truncated at the lower vertex, the polyhedron penetrates the earth. Most researchers, however, have concluded that Dürer's polyhedron is a six-sided solid with each side shaped as a rhombus, and that the solid has been truncated so that it can be circumscribed in a sphere. Nevertheless, disagreements remain over the polyhedron and any possible meaning that it may convey, and a method of creating a polyhedral net corresponding to Dürer's polyhedron has heretofore been absent.

Later, polyhedral nets were commonly used in cartography to resolve the earth's surface into a polyhedron. Examples of this can be found in patents to J. M. Boorman (U.S. Pat. No. 185,889), G. W. Bacon (U.S. Pat. No. 1,050,596), B. J. S. Cahill (U.S. Pat. No. 1,081,207), and Buckminster Fuller (U.S. Pat. No. 2,393,676).

Constructing polyhedral nets requires precise computing, measuring, drawing, cutting, and constructing. As such, polyhedral nets may be used in teaching lessons related to math (especially algebra and geometry) and art. Polyhedra constructed from polyhedral nets are also known to have interesting strength characteristics (they can often carry loads many times larger than their own weight,) and may also be used in teaching lessons related to physics.

Through history, polyhedra have been closely associated with the world of art. The peak of this relationship was certainly in the Renaissance. For some Renaissance artists, polyhedra simply provided challenging models to demonstrate their mastery of perspective. For others, polyhedra were symbolic of deep religious or philosophical truths. For example, Plato's association in the *Timaeus* between the Platonic solids and the elements of fire, earth, air, and water (and the universe) was of great import in the Renaissance. This was tied to the mastery of geometry necessary for perspective, and suggested a mathematical foundation for rationalizing artistry and understanding sight, just as renaissance science explored mathematical and visual foundations for understanding the physical world, astronomy, and anatomy. For other artists, polyhedra simply provide inspiration and a storehouse of forms with various symmetries from which to draw on.

Also, geometry as art seems the most natural approach for teaching this subject, just as at the times of Dürer when he believed that:

> ... Since geometry is the right foundation of all painting, I have decided to teach its rudiments and principles to all youngsters eager for art ... *Course in the Art of Measurement*

Norman Shapiro, M.A., who is a teacher and an artist with more than thirty years of teaching experience, with art works in many collections: The Museum of Modern Art, the archives of several universities (Idaho State at Boise, Indiana State at Bloomington), and in many private collections, says: The best way for children to learn about geometry is to take up pencil and straight edge (a ruler will do) and design geometrically on paper. Children need to feel about geometry the way the Egyptians did. Children learn best when they too see geometry as a means to an end. Children are artists at heart. The rationale of making something geometry into art doesn't need explanation. To children, beauty comes before logic and theories; therefore, Geometry Through Art can provide the means.

The relationship between geometry and art appears in different ways: proportion, perspective, symmetry, abstraction and symbolic subject matter. Mathematics is not just about formulas and logic, but also about patterns, symmetry, structure, shape and beauty. Courses are given to study connections between mathematics and art and architecture, study topics like tilings, polyhedra and perspective.

N-dimensional forms are created from lines, polygons, and polyhedra. A 2-dimensional polygon has 1-dimensional sides, a 3-dimensional polyhedron has sides or faces which are 2-dimensional polygons, a 4-dimensional polyhedron has sides that are 3-dimensional polyhedra, etc. A 4-dimensional polyhedron that has four sides, for example, could be constructed by building a 3-dimensional "core" polyhedron, and building four "side" 3-dimensional polyhedra that represent the sides of the 4-dimensional polyhedron. Each "side" 3-dimensional polyhedron has a face of similar dimensions in common with one face of the "core" 3-dimensional polyhedron, etc.

SUMMARY

Methods and systems are disclosed herein for producing a plurality of polyhedral nets and creating polyhedrons from the polyhedral nets. In one embodiment, a system utilizes the methods set forth herein to construct polyhedral nets and outputs the polyhedral nets through a display or printer, either in part or in whole.

DETAILED DESCRIPTION

An exemplary three dimensional polyhedra (100) produced according to one embodiment may be constructed as follows. A flat piece of foldable material (110) may be provided. An orthogonal coordinate system having a horizontal axis denoted ($\alpha$), a vertical axis denoted ($\beta$), and an origin denoted (1) may then be defined on the material (110). The coordinate system may or may not be a typical Cartesian coordinate system with values increasing upwardly and to the right. Values greater than zero may then be selected for a distance (X) and a constant (Y). A value between (but not including) zero and one hundred and eighty degrees may be selected for an angle (D).

Figure 1A:
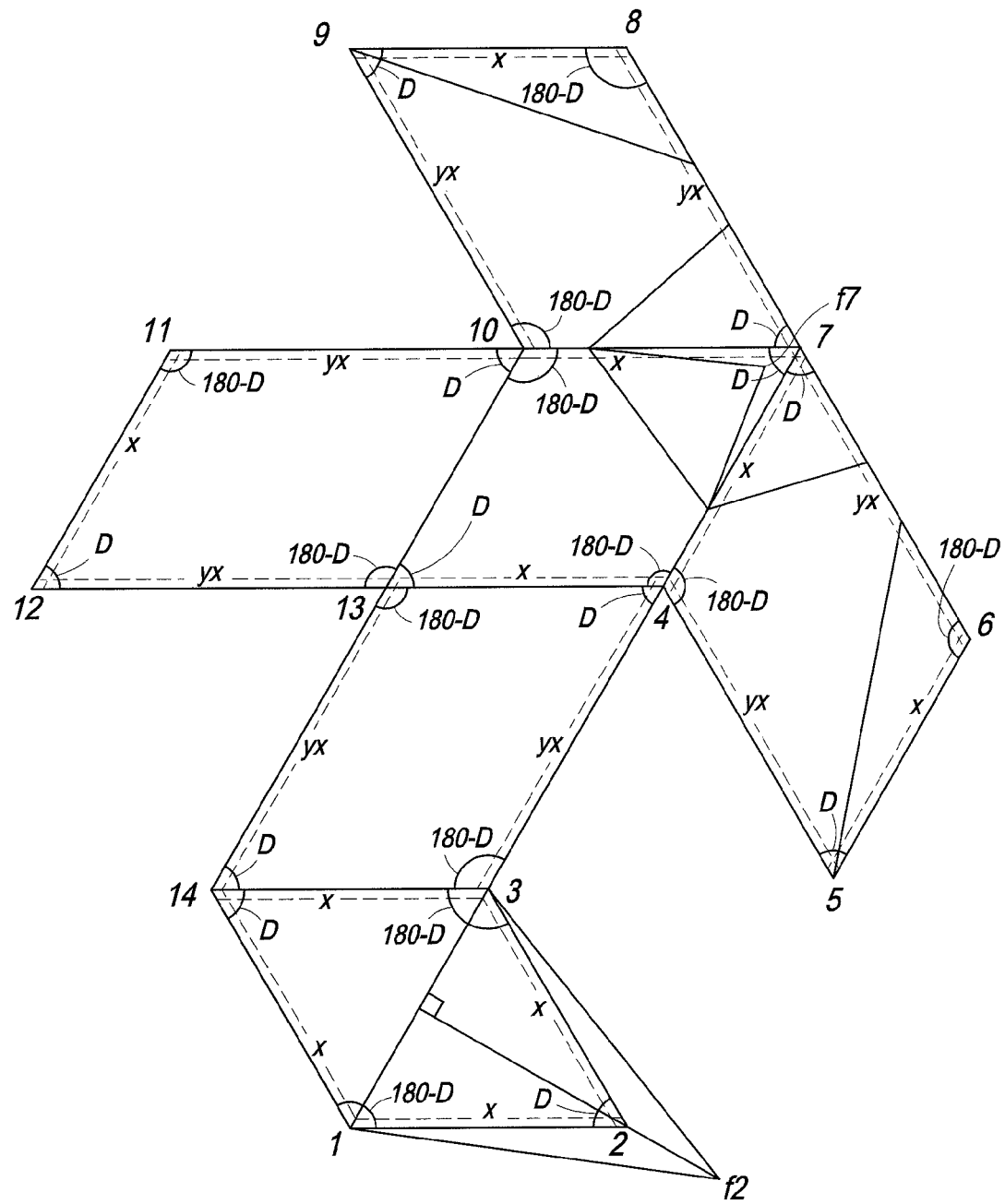
FIG. 1a shows a polyhedral net according to an embodiment with various details omitted.
Figure 1B:
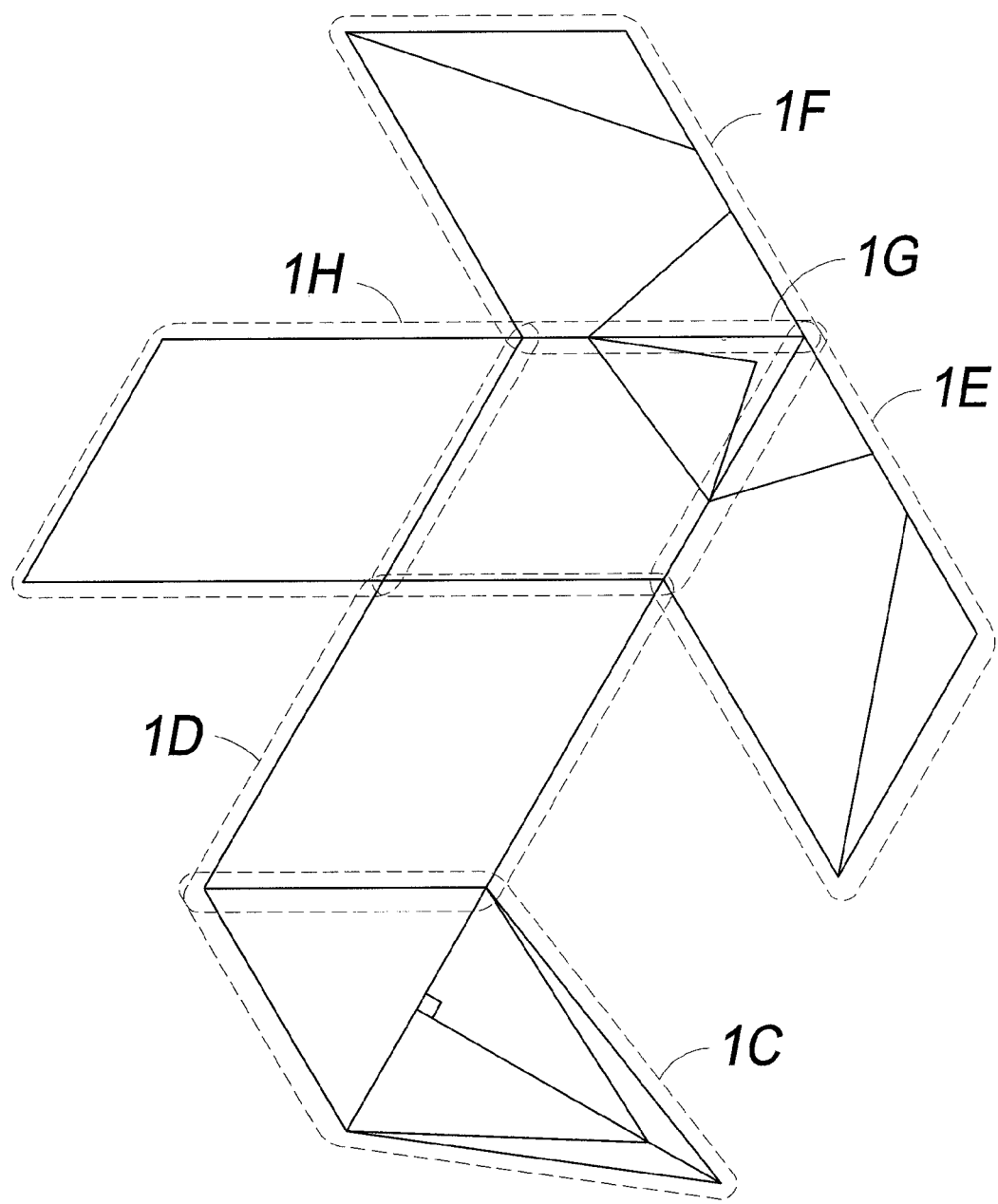
FIG. 1b shows the polyhedral net of FIG. 1a with sectional views labeled.
Figure 1C:
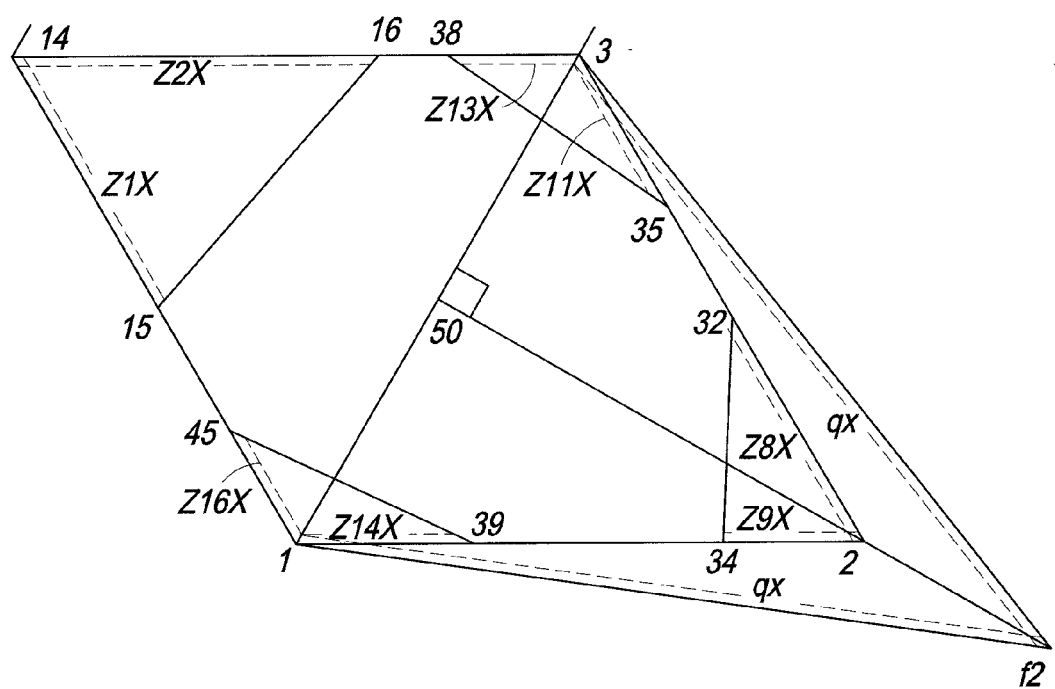
FIGS. 1c through 1h show different faces of the polyhedral net of FIG. 1a in detail.
Figure 1D:
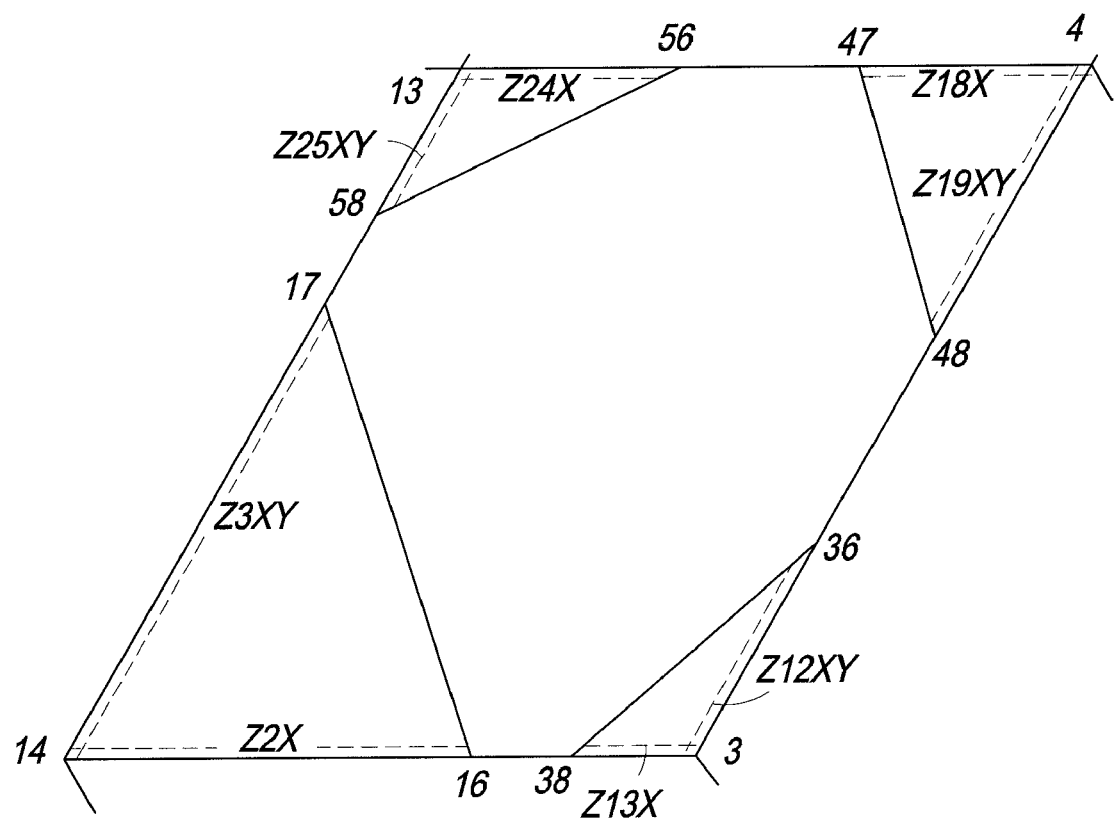
Figure 1E:
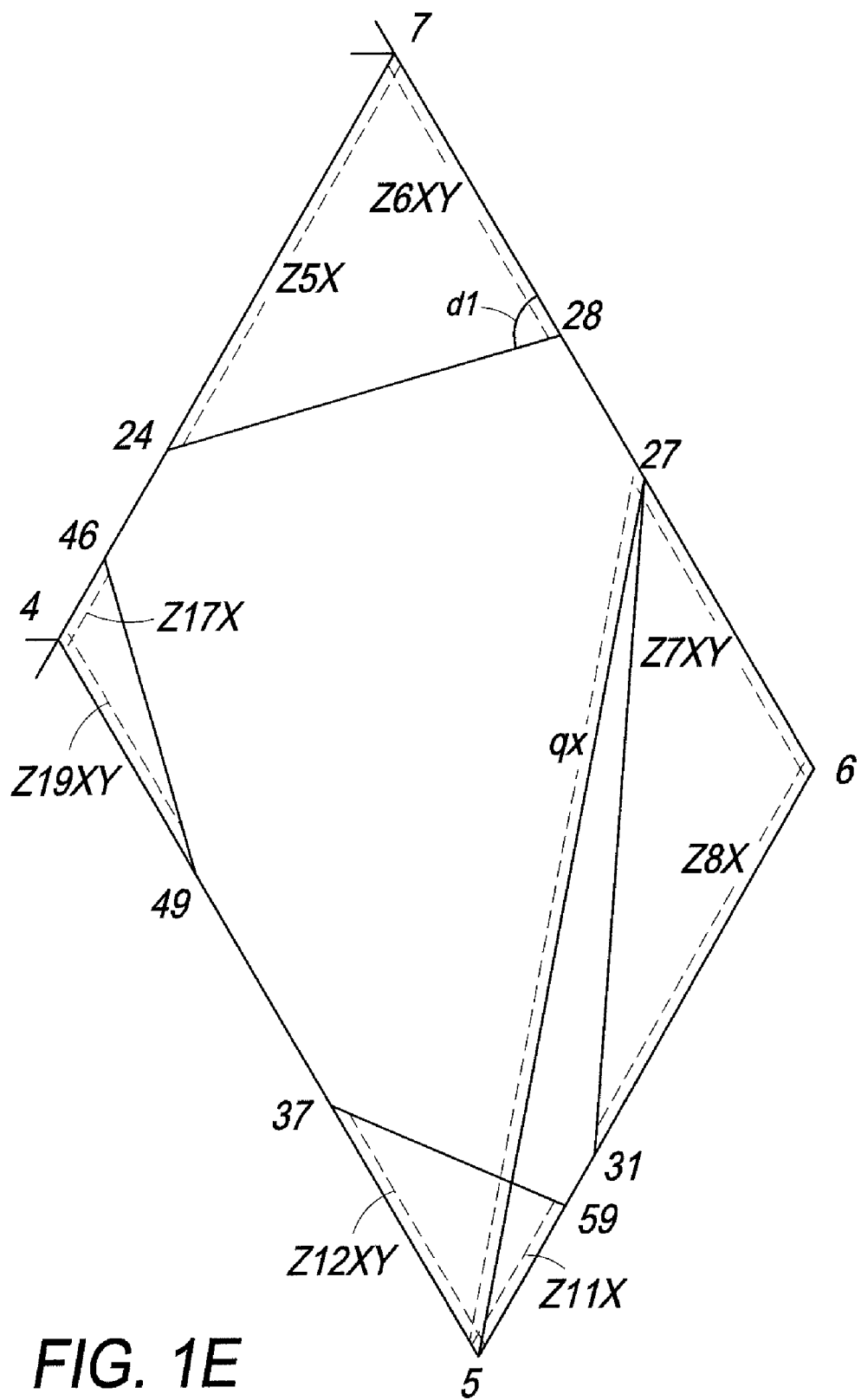
Figure 1F:
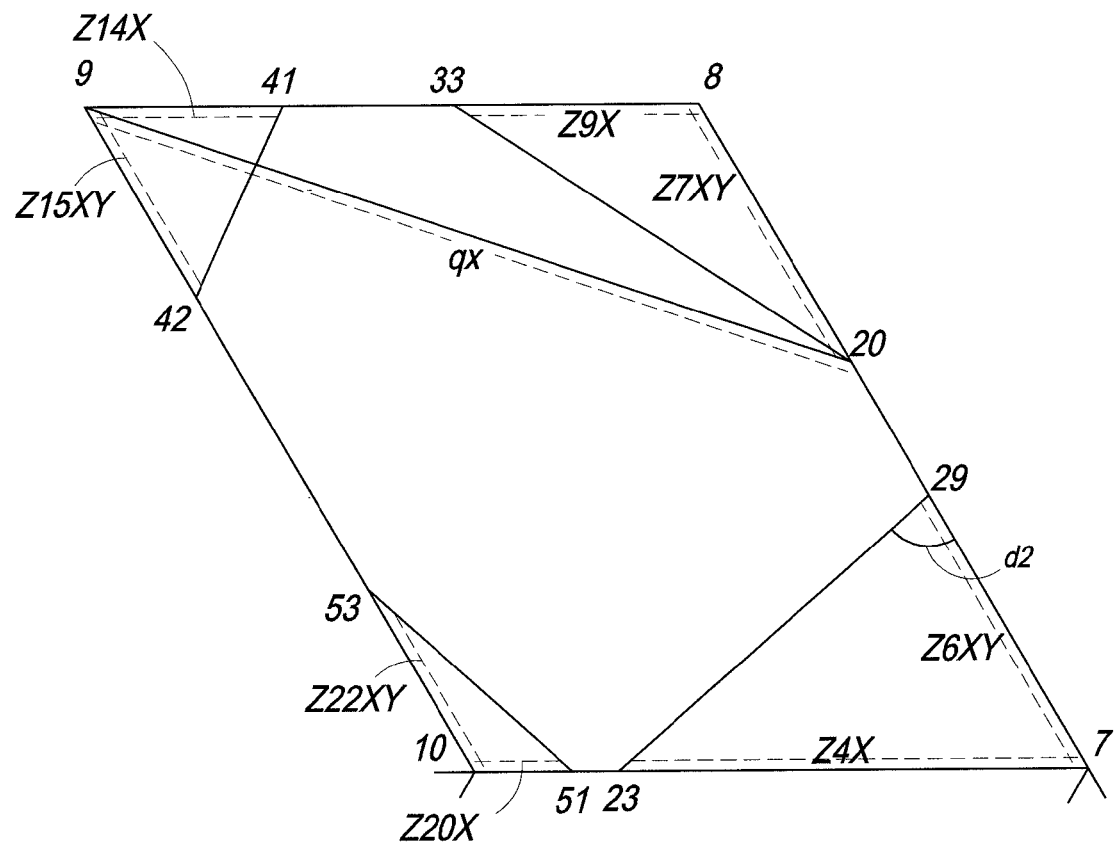
Figure 1G:
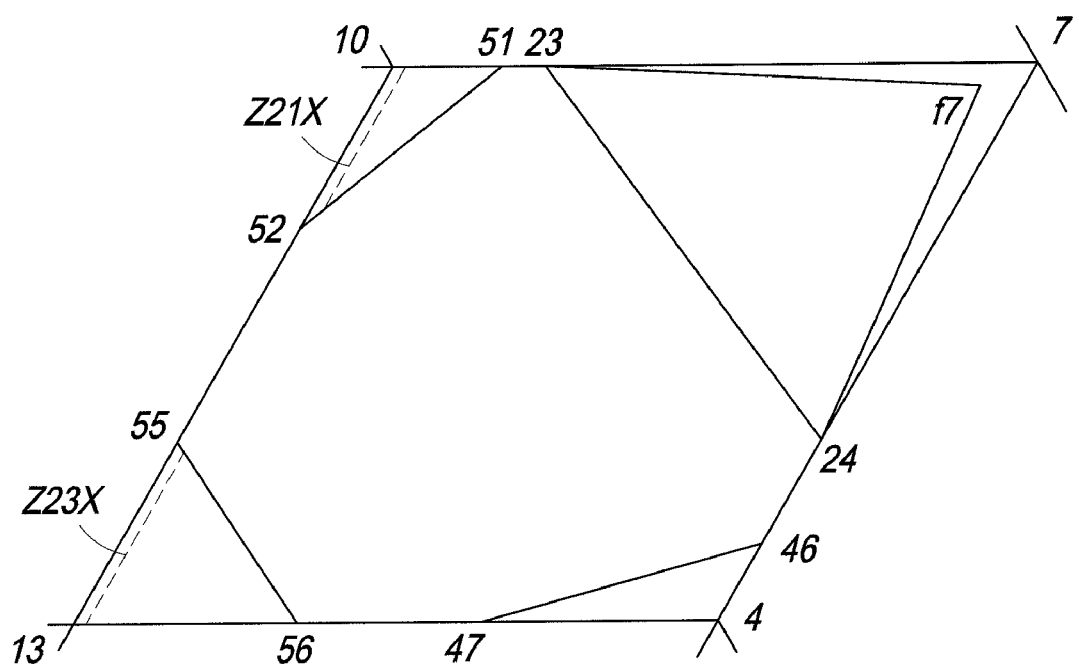
Figure 1H:
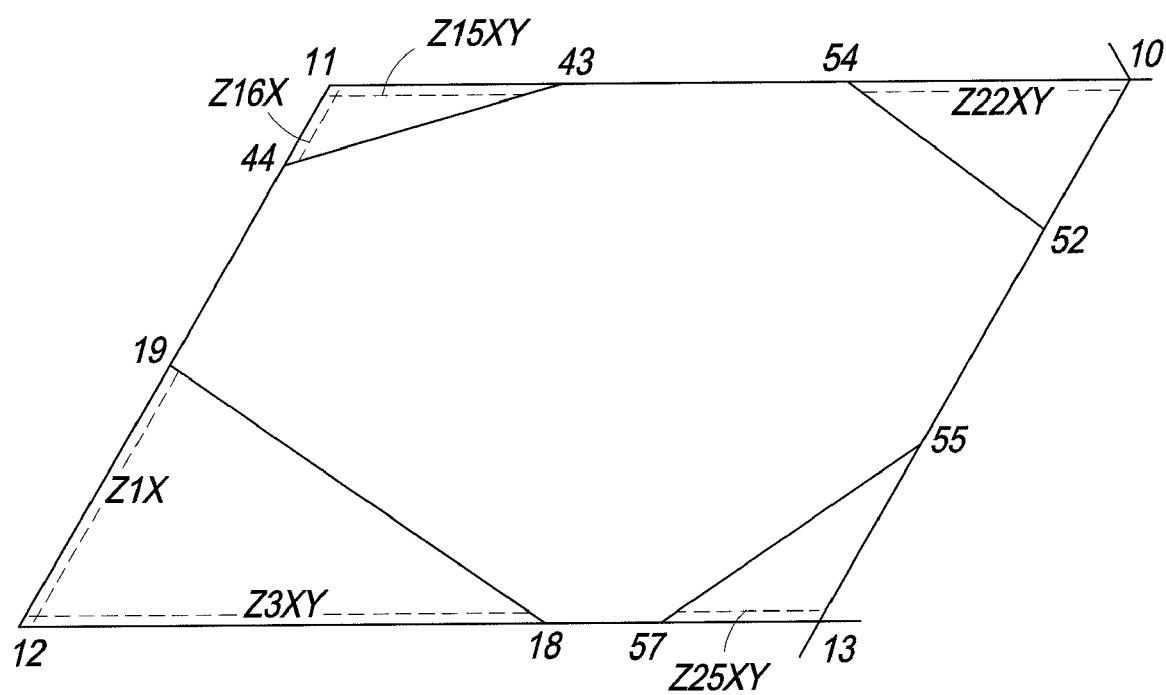
Figure 2:
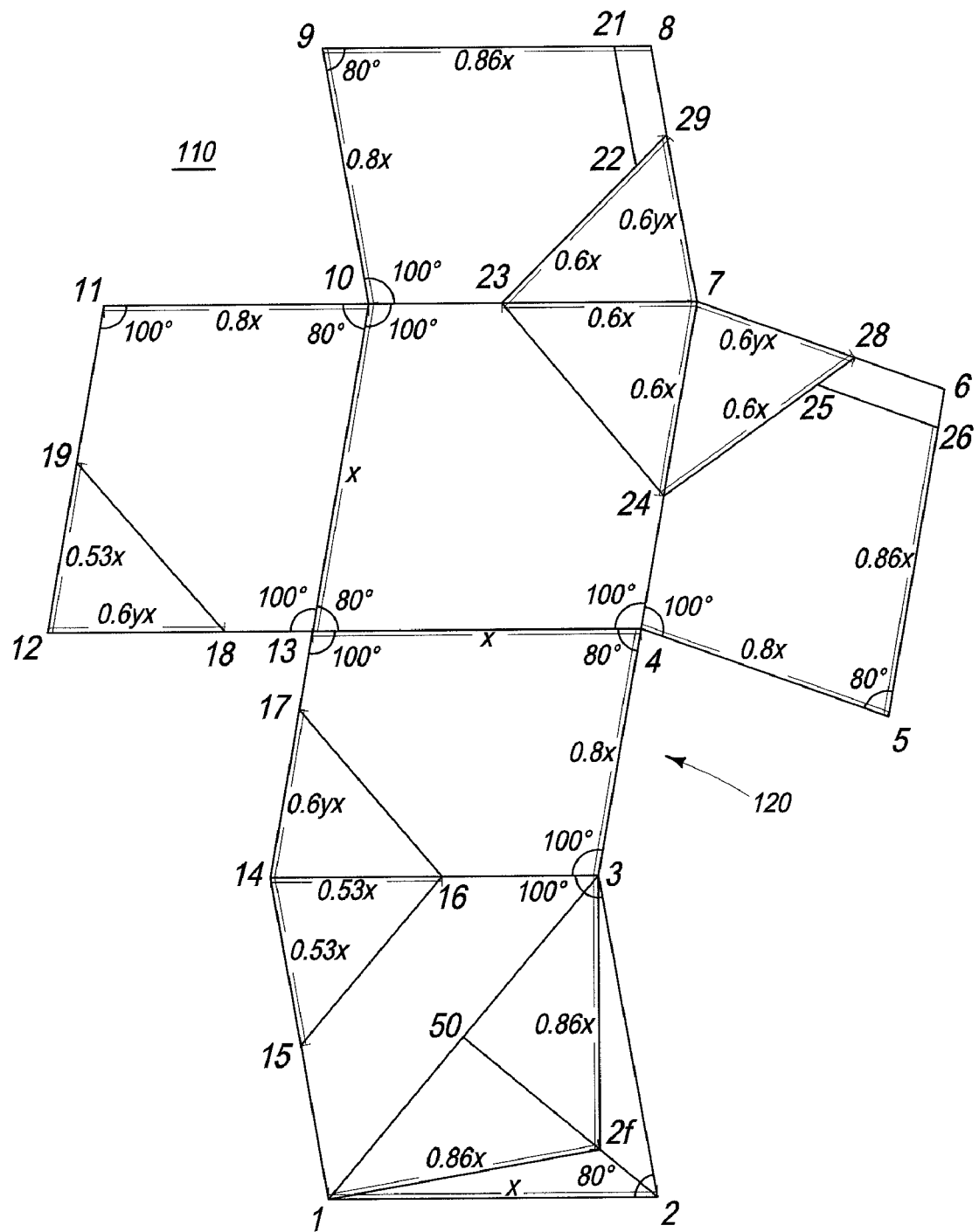
FIG. 2 shows a polyhedral net according to an embodiment, the polyhedral net having a value of D=80 degrees and Y=0.8.

As shown in FIGS. 1a through 2, a line may then be drawn along the horizontal axis ($\alpha$) from the origin (1) to a new point (2) that is the distance (X) from the origin (1), whereby forming a line (1)-(2). The line may then be continued from the point (2) at an angle of (180-D) degrees from ($\alpha$) to a new point (3) that is the distance (X) from the point (2), whereby forming a line (2)-(3). The line may then be continued from the point (3) at the angle of (D) degrees from ($\alpha$) to a new point (4) that is the distance (X)(Y) from the point (3), whereby forming a line (3)-(4). It should be clear that the distance (X)(Y) is equal to the distance (X) multiplied by the constant (Y), and (X)(Y) may be denoted herein as (XY). The line may then be continued from the point (4) at an angle of (-[180-2D]) degrees from ($\alpha$) to new point (5) that is the distance (XY) from the point (4), whereby forming a line (4)-(5). The line may then be continued from the point (5) at the angle of (D) degrees from ($\alpha$) to a new point (6) that is the distance (X) from the point (5), whereby forming a line (5)-(6). The line may then be continued from the point (6) at an angle of (2D) degrees from ($\alpha$) a new point (7) that is the distance (XY) from the point (6), whereby forming a line (6)-(7). The line may then be continued from the point (7) at an angle of (180-D) degrees from ($\alpha$) to a new point (8) that is the distance (XY) from the point (7), whereby forming a line (7)-(8). The line may then be continued from the point (8) at an angle of 180 degrees from ($\alpha$) to a new point (9) that is the distance (X) from the point (8), whereby forming a line (8)-(9). The line may then be continued from the point (9) at an angle of (-D) degrees from ($\alpha$) to a new point (10) that is the distance (XY) from the point (9), whereby forming a line (9)-(10). The line may then be continued from the point (10) at an angle of 180 degrees from ($\alpha$) to a new point (11) that is the distance (XY) from the point (10), whereby forming a line (10)-(11). The line may then be continued from the point (11) at an angle of (-[180-D]) degrees from ($\alpha$) to a new point (12) that is the distance (X) from the point (11), whereby forming a line (11)-(12). The line may then be continued from the point (12) at an angle of zero degrees from ($\alpha$) to a new point (13) that is the distance (XY) from the point (12), whereby forming a line (12)-(13). In other words, the line (12)-(13) is parallel to ($\alpha$). The line may then be continued from the point (13) at an angle of (-[180-D]) degrees from ($\alpha$) to a new point (14) that is the distance (XY) from the point (13), whereby forming a line (13)-(14). The line may then be continued from the point (14) at an angle of (-D) degrees from ($\alpha$) to the origin (1) that is the distance (X) from the point (14), whereby forming a line (14)-(1).

The point (14) may then be connected to the point (3) with indicia (i.e., ink, graphite, etc.), forming a fold line (3)-(14). The point (13) may then be connected to the point (4) with indicia, forming a fold line (4)-(13). The point (13) may then be connected to the point (10), forming a fold line (10)-(13). The point (10) may then be connected to the point (7), forming a fold line (7)-(10). The point (4) may then be connected to the point (7), forming a fold line (4)-(7).

A polyhedron net (120) constructed of the foldable material (110) may then be separated from excess foldable material (110) by cutting along the following lines: (1)-(2), (2)-(3), (3)-(4), (4)-(5), (5)-(6), (6)-(7), (7)-(8), (8)-(9), (9)-(10), (10)-(11), (11)-(12), (12)-(13), (13)-(14), and (14)-(1).

To begin to form a three dimensional polyhedron from the polyhedron net, the polyhedron net may be folded along the fold lines (3)-(14), (4)-(13), (10)-(13), (7)-(10), and (4)-(7) with all of the fold lines being located on an exterior surface of the polyhedron.

The line (7)-(8) may be secured to the line (7)-(6), forming a polyhedral edge ((7)-(8))-((6)-(7)). The line (9)-(10) may then be secured to the line (10)-(11), forming a polyhedral edge ((9)-(10))-((10)-(11)). The line (4)-(5) may be secured to the line (3)-(4), forming a polyhedral edge ((4)-(5))-((3)-(4)). Then the line (12)-(13) may be secured to the line (13)-(14), forming a polyhedral edge ((12)-(13))-((13)-(14)). The line (2)-(3) may be secured to the line (5)-(6), forming a polyhedral edge ((2)-(3))-((5)-(6)). The line (1)-(2) may be secured to the line (8)-(9), forming a polyhedral edge ((1)-(2))-((8)-(9)). The line (1)-(14) may then be secured to the line (11)-(12), forming a polyhedral edge ((1)-(14))-((11)-(12)). An adhesive tape or another common fastener may be used to secure together the above-noted lines. Once all of the above steps are completed, the three dimensional polyhedra (100) is produced.

A net (120) for an exemplary truncated polyhedron (100) may be produced according to another embodiment as follows. Another flat piece of foldable material (110) may be provided, and an orthogonal coordinate system having the horizontal axis denoted ($\alpha$), the vertical axis denoted ($\beta$), and the origin denoted (1) may be defined on the material (110). Values greater than zero may again be selected for the distance (X) and the constant (Y). A value between zero and one hundred and eighty degrees may again be selected for an angle (D).

Values equal to or greater than zero and equal to or less than one may then be selected for the truncating constants ($Z_1$), ($Z_2$), ($Z_3$), ($Z_4$), ($Z_5$), ($Z_6$), ($Z_7$), ($Z_8$), ($Z_9$), ($Z_{11}$), ($Z_{12}$), ($Z_{13}$), ($Z_{14}$), ($Z_{15}$), ($Z_{16}$), ($Z_{17}$), ($Z_{18}$), ($Z_{19}$), ($Z_{20}$), ($Z_{21}$), ($Z_{22}$), ($Z_{23}$), ($Z_{24}$), and ($Z_{25}$). The value for the truncating constant ($Z_7$) is less than or equal to the difference between one and the truncating constant ($Z_6$). The value for the truncating constant ($Z_{11}$) is less than or equal to the difference between one and the truncating constant ($Z_8$). The value for the truncating constant ($Z_{13}$) is less than or equal to the difference between one and the truncating constant ($Z_2$). The value for the truncating constant ($Z_{14}$) is less than or equal to the difference between one and the truncating constant ($Z_9$). The value for the truncating constant ($Z_{16}$) is less than or equal to the difference between one and the truncating constant ($Z_1$). The value for the truncating constant ($Z_{17}$) is less than or equal to the difference between one and the truncating constant ($Z_5$). The value for the truncating constant ($Z_{19}$) is less than or equal to the difference between one and the truncating constant ($Z_{12}$). The value for the truncating constant ($Z_{20}$) is less than or equal to the difference between one and the truncating constant ($Z_4$). The value for the truncating constant ($Z_{22}$) is less than or equal to the difference between one and the truncating constant ($Z_{15}$). The value for the truncating constant ($Z_{23}$) is less than or equal to the difference between one and the truncating constant ($Z_{21}$). The value for the truncating constant ($Z_{24}$) is less than or equal to the difference between one and the truncating constant ($Z_{18}$). The value for the truncating constant ($Z_{25}$) is less than or equal to the difference between one and the truncating constant ($Z_3$).

A line may then be drawn along the horizontal axis ($\alpha$) from the origin (1) to a new point (2) that is the distance (X) from the origin (1), whereby forming a line (1)-(2). The line may then be continued from the point (2) at an angle of (180–D) degrees from ($\alpha$) to a new point (3) that is the distance (X) from the point (2), whereby forming a line (2)-(3). The line may then be continued from the point (3) at the angle of (D) degrees from ($\alpha$) to a new point (4) that is the distance (X)(Y) from the point (3), whereby forming a line (3)-(4). It should be clear that the distance (X)(Y) is equal to the distance (X) multiplied by the constant (Y), and (X)(Y) may be denoted herein as (XY). The line may then be continued from the point (4) at an angle of (–[180–2D]) degrees from ($\alpha$) to new point (5) that is the distance (XY) from the point (4), whereby forming a line (4)-(5). The line may then be continued from the point (5) at the angle of (D) degrees from ($\alpha$) to a new point (6) that is the distance (X) from the point (5), whereby forming a line (5)-(6). The line may then be continued from the point (6) at an angle of (2D) degrees from ($\alpha$) a new point (7) that is the distance (XY) from the point (6), whereby forming a line (6)-(7). The line may then be continued from the point (7) at an angle of (180–D) degrees from ($\alpha$) to a new point (8) that is the distance (XY) from the point (7), whereby forming a line (7)-(8). The line may then be continued from the point (8) at an angle of 180 degrees from ($\alpha$) to a new point (9) that is the distance (X) from the point (8), whereby forming a line (8)-(9). The line may then be continued from the point (9) at an angle of (–D) degrees from ($\alpha$) to a new point (10) that is the distance (XY) from the point (9), whereby forming a line (9)-(10). The line may then be continued from the point (10) at an angle of 180 degrees from ($\alpha$) to a new point (11) that is the distance (XY) from the point (10), whereby forming a line (10)-(11). The line may then be continued from the point (11) at an angle of (–[180–D]) degrees from ($\alpha$) to a new point (12) that is the distance (X) from the point (11), whereby forming a line (11)-(12). The line may then be continued from the point (12) at an angle of zero degrees from ($\alpha$) to a new point (13) that is the distance (XY) from the point (12), whereby forming a line (12)-(13). In other words, the line (12)-(13) is parallel to ($\alpha$). The line may then be continued from the point (13) at an angle of (–[180–D]) degrees from ($\alpha$) to a new point (14) that is the distance (XY) from the point (13), whereby forming a line (13)-(14). The line may then be continued from the point (14) at an angle of (–D) degrees from ($\alpha$) to the origin (1) that is the distance (X) from the point (14), whereby forming a line (14)-(1).

The point (14) may then be connected to the point (3) with indicia (i.e., ink, graphite, etc.), forming a fold line (3)-(14). The point (13) may then be connected to the point (4) with indicia, forming a fold line (4)-(13). The point (13) may then be connected to the point (10), forming a fold line (10)-(13). The point (10) may then be connected to the point (7), forming a fold line (7)-(10). The point (4) may then be connected to the point (7), forming a fold line (4)-(7).

A point (15) may then be marked along the line (14)-(1) at a distance ($Z_1$) multiplied by (X), also denoted as ($Z_1$X), from the point (14). A point (19) may then be marked along the line (11)-(12) at the distance ($Z_1$X), from the point (12). A point (16) may then be marked along the fold line (3)-(14) at a distance ($Z_2$) multiplied by (X), also denoted as ($Z_2$X), from the point (14). A point (17) may then be marked along the line (13)-(14) at a distance ($Z_3$) multiplied by (X) multiplied by (Y), also denoted as ($Z_3$XY), from the point (14). A point (18) may then be marked along the line (12)-(13) at the distance ($Z_3$XY) from the point (12). A point (23) may then be marked along the fold line (7)-(10) at a distance ($Z_4$) multiplied by (X), also denoted as ($Z_4$X), from the point (7). A point (24) may then be marked along the fold line (4)-(7) at a distance ($Z_5$) multiplied by (X), also denoted as ($Z_5$X), from the point (7). A point (28) may then be marked along the line (6)-(7) at a distance ($Z_6$) multiplied by (X) multiplied by (Y), also denoted as ($Z_6$XY), from the point (7). A point (29) may then be marked along the line (7)-(8) at the distance ($Z_6$XY) from the point (7). A point (27) may then be marked along the line (6)-(7) at a distance ($Z_7$) multiplied by (X) multiplied by (Y), also denoted as ($Z_7$XY), from the point (6). A point (20) may then be marked along the line (7)-(8) at the distance ($Z_7$XY) from the point (8). A point (31) may then be marked along the line (5)-(6) at a distance ($Z_8$) multiplied by (X), also denoted as ($Z_8$X), from the point (6). A point (32) may then be marked along the line (2)-(3) at the distance ($Z_8$X) from the point (2). A point (33) may then be marked along the line (8)-(9) at a distance ($Z_9$) multiplied by (X), also denoted as ($Z_9$X), from the point (8). A point (34) may then be marked along the line (1)-(2) at the distance ($Z_9$X) from the point (2). A point (59) may then be marked along the line (5)-(6) at a distance ($Z_{11}$) multiplied by (X), also denoted as ($Z_{11}$X), from the point (5). A point (35) may then be marked along the line (2)-(3) at the distance ($Z_{11}$X) from the point (3). A point (36) may then be marked along the line (3)-(4) at a distance ($Z_{12}$) multiplied by (X) multiplied by (Y), also denoted as ($Z_{12}$XY), from the point (3). A point (37) may then be marked along the line (4)-(5) at the distance ($Z_{12}$XY) from the point (5). A point (38) may then be marked along the fold line (3)-(14) at a distance ($Z_{13}$) multiplied by (X), also denoted as ($Z_{13}$X), from the point (3). A point (39) may then be marked along the line (1)-(2) at the at a distance ($Z_{14}$) multiplied by (X), also denoted as ($Z_{14}$X) from the point (1). A point (41) may then be marked along the line (8)-(9) at the distance ($Z_{14}$X) from the point (9). A point (42) may then be marked along the fold line (9)-(10) at a distance ($Z_{15}$) multiplied by (X) multiplied by (Y), also denoted as ($Z_{15}$XY), from the point (9). A point (43) may then be marked along the line (10)-(11) at the at a distance ($Z_{15}$) multiplied by (X) multiplied by (Y), also denoted as ($Z_{15}$XY) from the point (11). A point (44) may then be marked along the line (11)-(12) at a distance ($Z_{16}$) multiplied by (X), also denoted as ($Z_{16}$X), from the point (11). A point (45) may then be marked along the line (14)-(1) at the distance ($Z_{16}$X) from the point (1). A point (46) may then be marked along the fold line (4)-(7) at a distance ($Z_{17}$)

multiplied by (X), also denoted as ($Z_{17}$X), from the point (4). A point (47) may then be marked along the fold line (4)-(13) at a distance ($Z_{17}$) multiplied by (X), also denoted as ($Z_{17}$X) from the point (4). A point (48) may then be marked along the line (3)-(4) at a distance ($Z_{19}$) multiplied by (X) multiplied by (Y), also denoted as ($Z_{19}$XY), from the point (4). A point (49) may then be marked along the line (4)-(5) at the distance ($Z_{19}$XY) from the point (4). A point (51) may then be marked along the fold line (7)-(10) at a distance ($Z_{20}$) multiplied by (X), also denoted as ($Z_{20}$X), from the point (10). A point (52) may then be marked along the fold line (10)-(13) at a distance ($Z_{21}$) multiplied by (X), also denoted as ($Z_{21}$X) from the point (10). A point (53) may then be marked along the line (9)-(10) at a distance ($Z_{22}$) multiplied by (X) multiplied by (Y), also denoted as ($Z_{22}$XY), from the point (10). A point (54) may then be marked along the line (10)-(11) at the distance ($Z_{22}$XY) from the point (10). A point (55) may then be marked along the fold line (10)-(13) at a distance ($Z_{23}$) multiplied by (X), also denoted as ($Z_{23}$X), from the point (13). A point (56) may then be marked along the fold line (4)-(13) at a distance ($Z_{24}$) multiplied by (X), also denoted as ($Z_{24}$X), from the point (13). A point (57) may then be marked along the line (12)-(13) at a distance ($Z_{25}$) multiplied by (X) multiplied by (Y), also denoted as ($Z_{25}$XY) from the point (13). A point (58) may then be marked along the line (13)-(14) at the distance ($Z_{25}$XY) from the point (13).

The point (15) may then be connected to the point (16) with indicia (i.e., ink, graphite, etc.), forming a fold line (15)-(16) and a triangle (14)-(15)-(16). The point (16) may then be connected to the point (17) with indicia, forming a fold line (16)-(17) and a triangle (14)-(16)-(17). The point (56) may then be connected to the point (58), forming a fold line (56)-(58) and a triangle (13)-(56)-(58). The point (55) may then be connected to the point (56), forming a fold line (55)-(56) and a triangle (13)-(55)-(56).

The point (55) may then be connected to the point (57), whereby forming a fold line (55)-(57) and a triangle (13)-(55)-(57). The point (18) may then be connected to the point (19), whereby forming a fold line (18)-(19) and a triangle (12)-(18)-(19). The point (43) may then be connected to the point (44), whereby forming a fold line (43)-(44) and a triangle (11)-(43)-(44). The point (52) may then be connected to the point (54), whereby forming a fold line (52)-(54) and a triangle (10)-(52)-(54). The point (51) may then be connected to the point (52), whereby forming a fold line (51)-(52) and a triangle (10)-(51)-(52). The point (51) may then be connected to the point (53), whereby forming a fold line (51)-(53) and a triangle (10)-(51)-(53). The point (41) may then be connected to the point (42), whereby forming a fold line (41)-(42) and a triangle (9)-(41)-(42). The point (20) may then be connected to the point (33), whereby forming a fold line (20)-(33) and a triangle (8)-(20)-(33). The point (23) may then be connected to the point (29), whereby forming a fold line (23)-(29) and a triangle (7)-(23)-(29). The point (23) may then be connected to the point (24), whereby forming a fold line (23)-(24) and a triangle (7)-(23)-(24). The point (24) may then be connected to the point (28), whereby forming a fold line (24)-(28) and a triangle (7)-(24)-(28). The point (27) may then be connected to the point (31), whereby forming a fold line (27)-(31) and a triangle (6)-(27)-(31). The point (37) may then be connected to the point (59), whereby forming a fold line (37)-(59) and a triangle (5)-(37)-(59). The point (46) may then be connected to the point (49), whereby forming a fold line (46)-(49) and a triangle (4)-(46)-(49). The point (46) may then be connected to the point (47), whereby forming a fold line (46)-(47) and a triangle (4)-(46)-(47). The point (47) may then be connected to the point (48), whereby forming a fold line (47)-(48) and a triangle (4)-(47)-(48). The point (36) may then be connected to the point (38), whereby forming a fold line (36)-(38) and a triangle (3)-(36)-(38). The point (35) may then be connected to the point (38), whereby forming a fold line (35)-(38) and a triangle (3)-(35)-(38). The point (32) may then be connected to the point (34), whereby forming a fold line (32)-(34) and a triangle (2)-(32)-(34). The point (39) may then be connected to the point (45), whereby forming a fold line (39)-(45) and a triangle (1)-(39)-(45).

To ensure the above steps have been correctly completed, various verifications may then be made. If any of the following verifications cannot be made, the earlier steps should be revisited to make necessary corrections. It may be verified that the fold line (24)-(28) has a distance of $\sqrt{[(Z_6XY)^2+(Z_5X)^2-2(Z_5Z_6X^2Y\cos(D))]}$. It may be verified that the fold line (23)-(29) has a distance of $\sqrt{[(Z_6XY)^2+(Z_4X)^2-2(Z_4Z_6X^2Y\cos(D))]}$. It may be verified that the fold line (23)-(24) has a distance of $\sqrt{[(Z_5X)^2+(Z_4X)^2-2(Z_4Z_5X^2\cos(D))]}$. It may be verified that the fold line (46)-(47) has a distance of $\sqrt{[(Z_{17}X)^2+(Z_{18}X)^2-2(Z_{17}Z_{18}X^2\cos(180-D))]}$. It may be verified that the fold line (46)-(49) has a distance of $\sqrt{[(Z_{17}X)^2+(Z_{19}XY)^2-2(Z_{17}Z_{19}X^2Y\cos(180-D))]}$. It may be verified that the fold line (47)-(48) has a distance of $\sqrt{[(Z_{19}XY)^2+(Z_{18}X)^2-2(Z_{18}Z_{19}X^2Y\cos(D))]}$. It may be verified that the fold line (37)-(59) has a distance of $\sqrt{[(Z_{12}XY)^2+(Z_{11}X)^2-2(Z_{11}Z_{12}X^2Y\cos(D))]}$. It may be verified that the fold line (36)-(38) has a distance of $\sqrt{[(Z_{12}XY)^2+(Z_{13}X)^2-2(Z_{12}Z_{13}X^2Y\cos(180-D))]}$. It may be verified that the fold line (35)-(38) has a distance of $\sqrt{[(Z_{13}X)^2+(Z_{11}X)^2-2(Z_{11}Z_{13}X^2\cos(180-D))]}$. It may be verified that the fold line (27)-(31) has a distance of $\sqrt{[(Z_7XY)^2+(Z_8X)^2-2(Z_7Z_8X^2Y\cos(180-D))]}$. It may be verified that the fold line (20)-(33) has a distance of $\sqrt{[(Z_7XY)^2+(Z_9X)^2-2(Z_7Z_9X^2Y\cos(180-D))]}$. It may be verified that the fold line (32)-(34) has a distance of $\sqrt{[(Z_8X)^2+(Z_9X)^2-2(Z_8Z_9X^2\cos(D))]}$. It may be verified that the fold line (39)-(45) has a distance of $\sqrt{[(Z_{14}X)^2+(Z_{16}X)^2-2(Z_{14}Z_{16}X^2\cos(180-D))]}$. It may be verified that the fold line (43)-(44) has a distance of $\sqrt{[(Z_{15}XY)^2+(Z_{16}X)^2-2(Z_{15}Z_{16}X^2Y\cos(180-D))]}$. It may be verified that the fold line (41)-(42) has a distance of $\sqrt{[(Z_{14}X)^2+(Z_{15}XY)^2-2(Z_{14}Z_{15}X^2Y\cos(D))]}$. It may be verified that the fold line (15)-(16) has a distance of $\sqrt{[(Z_1X)^2+(Z_2X)^2-2(Z_1Z_2X^2\cos(D))]}$. It may be verified that the fold line (16)-(17) has a distance of $\sqrt{[(Z_3XY)^2+(Z_2X)^2-2(Z_2Z_3X^2Y\cos(D))]}$. It may be verified that the fold line (18)-(19) has a distance of $\sqrt{[(Z_{22}XY)^2+(Z_3XY)^2-2(Z_1Z_3X^2Y\cos(D))]}$. It may be verified that the fold line (55)-(57) has a distance of $\sqrt{[(Z_{25}XY)^2+(Z_{23}X)^2-2(Z_{23}Z_{25}X^2Y\cos(180-D))]}$. It may be verified that the fold line (56)-(58) has a distance of $\sqrt{[(Z_{25}XY)^2+(Z_{24}X)^2-2(Z_{24}Z_{25}X^2Y\cos(180-D))]}$. It may be verified that the fold line (55)-(56) has a distance of $\sqrt{[(Z_{24}X)^2+(Z_{23}X)^2-2(Z_{23}Z_{24}X^2\cos(D))]}$. It may be verified that the fold line (51)-(53) has a distance of $\sqrt{[(Z_{22}XY)2+(Z_{20}X)^2-2(Z_{20}Z_{22}X^2Y\cos(180-D))]}$. It may be verified that the fold line (51)-(52) has a distance of $\sqrt{[(Z_{21}X)^2+(Z_{20}X)^2-2(Z_{20}Z_{21}X^2\cos(180-D))]}$. It may be verified that the fold line (52)-(54) has a distance of $\sqrt{[(Z_{21}X)^2+(Z_{22}XY)^2-2(Z_{21}Z_{22}X^2Y\cos(D))]}$.

To define the truncations, many modifications may then be made. First, either the (7)-(23)-(24) triangle, the (7)-(23)-(29) triangle, or the (7)-(24)-(28) triangle may be modified. Modifying the (7)-(23)-(24) triangle may include marking a point (f7) being equal to a distance of the fold line (24)-(28) away from the point (24) and being equal to a distance of the fold line (23)-(29) away from the point (23), whereby creating a triangle (f7)-(23)-(24). Modifying the (7)-(23)-(29) triangle may include marking a point (f7) being equal to a distance of the fold line (24)-(28) away from the point (29) and being equal to a distance of the fold line (23)-(24) away from the point (23), whereby creating a triangle (f7)-(23)-(29). Modifying the (7)-(24)-(28) triangle may include marking a point (f7) being equal to a distance of the fold line (23)-(24) away from the point (24) and being equal to a distance of the fold line (23)-(29) away from the point (28), whereby creating a triangle (f7)-(24)-(28).

Either the (4)-(46)-(47) triangle, the (4)-(46)-(49) triangle, or the (4)-(47)-(48) triangle may be modified. Modifying the (4)-(46)-(47) triangle may include marking a point (f4) being equal to a distance of the fold line (47)-(48) away from the point (47) and being equal to a distance of the fold line (46)-(49) away from the point (46), whereby creating a triangle (f4)-(46)-(47). Modifying the (4)-(46)-(49) triangle may include marking a point (f4) being equal to a distance of the fold line (47)-(48) away from the point (49) and being equal to a distance of the fold line (46)-(47) away from the point (46), whereby creating a triangle (f4)-(46)-(49). Modifying the (4)-(47)-(48) triangle may include marking a point (f4) being equal to a distance of the fold line (47)-(48) away from the point (47) and being equal to a distance of the fold line (46)-(49) away from the point (48), whereby creating a triangle (f4)-(47)-(48).

Either the (5)-(37)-(59) triangle, the (3)-(36)-(38) triangle, or the (3)-(35)-(38) triangle may be modified. Modifying the (5)-(37)-(59) triangle may include marking a point (f5) being equal to a distance of the fold line (36)-(38) away from the point (37) and being equal to a distance of the fold line (35)-(38) away from the point (59), whereby creating a triangle (f5)-(37)-(59). Modifying the (3)-(36)-(38) triangle may include marking a point (f5) being equal to a distance of the fold line (37)-(59) away from the point (36) and being equal to a distance of the fold line (35)-(38) away from the point (38), whereby creating a triangle (f5)-(36)-(38). Modifying the (3)-(35)-(38) triangle may include marking a point (f5) being equal to a distance of the fold line (37)-(59) away from the point (35) and being equal to a distance of the fold line (36)-(38) away from the point (38), whereby creating a triangle (f5)-(35)-(38).

Either the (6)-(27)-(31) triangle, the (8)-(20)-(33) triangle, or the (2)-(32)-(34) triangle may be modified. Modifying the (6)-(27)-(31) triangle may include marking a point (f6) being equal to a distance of the fold line (20)-(33) away from the point (27) and being equal to a distance of the fold line (32)-(34) away from the point (31), whereby creating a triangle (f6)-(27)-(31). Modifying the (8)-(20)-(33) triangle may include marking a point (f6) being equal to a distance of the fold line (32)-(34) away from the point (33) and being equal to a distance of the fold line (27)-(31) away from the point (20), whereby creating a triangle (f6)-(20)-(33). Modifying the (2)-(32)-(34) triangle may include marking a point (f6) being equal to a distance of the fold line (27)-(31) away from the point (32) and being equal to a distance of the fold line (20)-(33) away from the point (34), whereby creating a triangle (f6)-(32)-(34).

Either the (1)-(39)-(45) triangle, the (11)-(43)-(44) triangle, or the (9)-(41)-(42) triangle may be modified. Modifying the (1)-(39)-(45) triangle may include marking a point (f1) being equal to a distance of the fold line (41)-(42) away from the point (39) and being equal to a distance of the fold line (43)-(44) away from the point (45), whereby creating a triangle (f1)-(39)-(45). Modifying the (11)-(43)-(44) triangle may include marking a point (f1) being equal to a distance of the fold line (39)-(45) away from the point (44) and being equal to a distance of the fold line (41)-(42) away from the point (43), whereby creating a triangle (f1)-(43)-(44). Modifying the (9)-(41)-(42) triangle may include marking a point (f1) being equal to a distance of the fold line (43)-(44) away from the point (42) and being equal to a distance of the fold line (39)-(45) away from the point (41), whereby creating a triangle (f1)-(41)-(42).

Either the (12)-(18)-(19) triangle, the (14)-(16)-(17) triangle, or the (14)-(15)-(16) triangle may be modified. Modifying the (12)-(18)-(19) triangle may include marking a point (f12) being equal to a distance of the fold line (15)-(16) away from the point (19) and being equal to a distance of the fold line (16)-(17) away from the point (18), whereby creating a triangle (f12)-(18)-(19). Modifying the (14)-(16)-(17) triangle may include marking the point (f12) being equal to a distance of the fold line (18)-(19) away from the point (17) and being equal to a distance of the fold line (15)-(16) away from the point (16) whereby creating a triangle (f12)-(16)-(17). Modifying the (14)-(15)-(16) triangle may include marking the point (f12) being equal to a distance of the fold line (16)-(17) away from the point (16) and being equal to a distance of the fold line (18)-(19) away from the point (15) whereby creating a triangle (f12)-(15)-(16).

Either the (13)-(55)-(57) triangle, the (13)-(55)-(56) triangle, or the (13)-(56)-(58) triangle may be modified. Modifying the (13)-(55)-(57) triangle may include marking a point (f13) being equal to a distance of the fold line (56)-(58) away from the point (57) and being equal to a distance of the fold line (55)-(57) away from the point (55), whereby creating a triangle (f13)-(55)-(57). Modifying the (13)-(55)-(56) triangle may include marking a point (f13) being equal to a distance of the fold line (55)-(57) away from the point (55) and being equal to a distance of the fold line (56)-(58) away from the point (56), whereby creating a triangle (f13)-(55)-(56). Modifying the (13)-(56)-(58) triangle may include marking a point (f13) being equal to a distance of the fold line (55)-(57) away from the point (58) and being equal to a distance of the fold line (55)-(56) away from the point (56), whereby creating a triangle (f13)-(56)-(58).

Either the (10)-(51)-(53) triangle, the (10)-(52)-(54) triangle, or the (10)-(51)-(52) triangle may be modified. Modifying the (10)-(51)-(53) triangle may include marking a point (f10) being equal to a distance of the fold line (52)-(54) away from the point (53) and being equal to a distance of the fold line (51)-(52) away from the point (51), whereby creating a triangle (f10)-(51)-(53). Modifying the (10)-(52)-(54) triangle may include marking a point (f10) being equal to a distance of the fold line (51)-(53) away from the point (54) and being equal to a distance of the fold line (51)-(52) away from the point (52), whereby creating a triangle (f10)-(52)-(54). Modifying the (10)-(51)-(52) triangle may include marking a point (f10) being equal to a distance of the fold line (51)-(53) away from the point (51) and being equal to a distance of the fold line (52)-(54) away from the point (52), whereby creating a triangle (f10)-(51)-(52).

A three dimensional polyhedra (100) may be produced according to the above-described method by using the following values and including the following steps. $(Y)=0.8$; $(Z_1)=(Z_2)=0.53$; $(Z_3)=(Z_4)=(Z_5)=(Z_6)=0.6$; $(Z_7)=(Z_8)=(Z_9)=(Z_{11})=0$; $(Z_{12})=(Z_{13})=(Z_{14})=(Z_{15})=(Z_{16})=(Z_{17})=(Z_{18})=(Z_{19})=(Z_{20})=(Z_{21})=(Z_{22})=(Z_{23})=(Z_{24})=(Z_{25})=0$; $D=80$ degrees. (X) may still be any positive value greater than zero, and the selection of (X) affects only the size of the resulting polyhedra.

A point (25) may be marked along the fold line (24)-(28) at a distance of 0.6 multiplied by (X), also denoted 0.6(X), from the point (24). A point (26) may be marked along the line (5)-(6) at a distance of 0.86 multiplied by (X), also denoted 0.86(X), from the point (5). The point (25) may then be connected to the point (26), creating a fold line (25)-(26).

A point (22) may be marked along the fold line (23)-(29) at the distance of 0.6(X) from the point (23). A point (21) may be marked along the line (8)-(9) at the distance of 0.86(X) from the point (9). The point (21) may then be connected to the point (22), creating a fold line (21)-(22).

A point (50) may be marked at a midpoint of the fold line (1)-(3). The point (2) may then be connected to the point (50), creating a line (2)-(50) which is perpendicular to the fold line (1)-(3). A point (2f) may be marked along the line (2)-(50), the point (2f) being the distance of 0.86(X) from the point (1) and the distance of 0.86(X) from the point (3). A new triangle, (1)-(2f)-(3), is created with the point (2f).

The triangle (12)-(18)-(19) is modified to form the triangle (f12)-(18)-(19).

The polyhedron net (120) may then be separated from excess foldable material 110 by cutting along the following lines: (1)-(2f)-(3)-(4)-(5)-(6)-(7)-(8)-(9)-(10)-(11)-(19)-(f12)-(18)-(13)-(14)-(1). The line (14)-(16) may then be cut.

The polyhedron net (120) may then be folded along the fold lines (23)-(29), (24)-(28), (21)-(22), (25)-(26), (15)-(16), (16)-(17), (18)-(19), (23)-(24) with all of the fold lines being located on an exterior surface of the polyhedron.

The line (25)-(26) may be secured to the line (21)-(22). The line (9)-(10) may be secured to the line (10)-(11). The line (4)-(5) may be secured to the line (3)-(4). The line (13)-(18) may be secured to the line (13)-(17). The line (2f)-(3) may be secured to the line (5)-(26). The line (1)-(2f) may be secured to the line (9)-(21). The line (1)-(15) may be secured to the line (11)-(19). The line (7)-(28) may be secured to the line (7)-(29). The line (7)-(23) may be secured to the line (22)-(23). The line (7)-(24) may be secured to the line (24)-(25). The line (f12)-(19) may be secured to the line (15)-(16). The line (f12)-(18) may be secured to the line (16)-(17).

Figure 3:
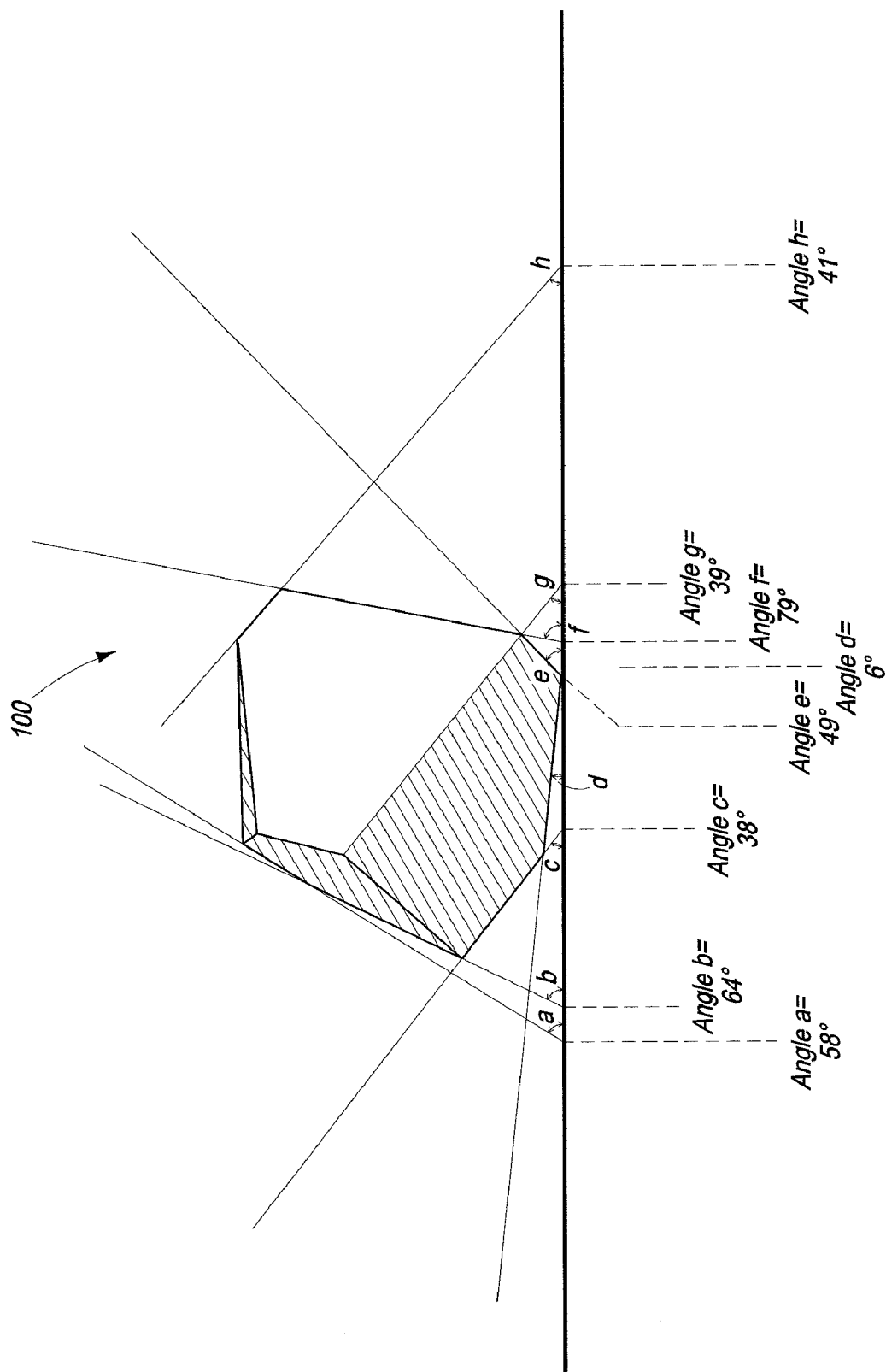
FIG. 3 shows a polyhedron created from the polyhedral net as in FIG. 2.
Figure 4:
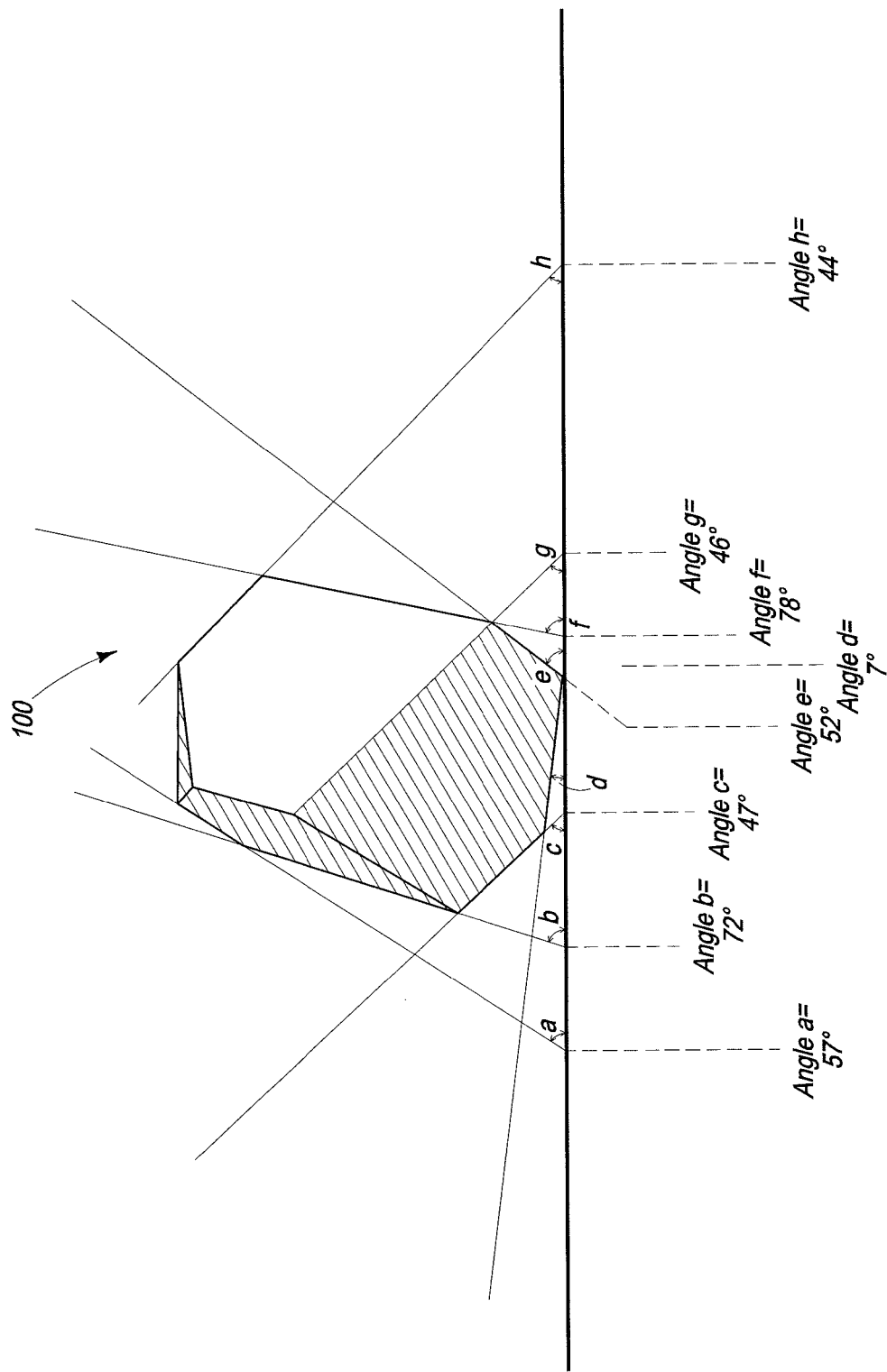
FIG. 4 shows a polyhedron created from the polyhedral net as in FIG. 1, the polyhedral net having a value of D=72 degrees and Y=1.
Figure 5:
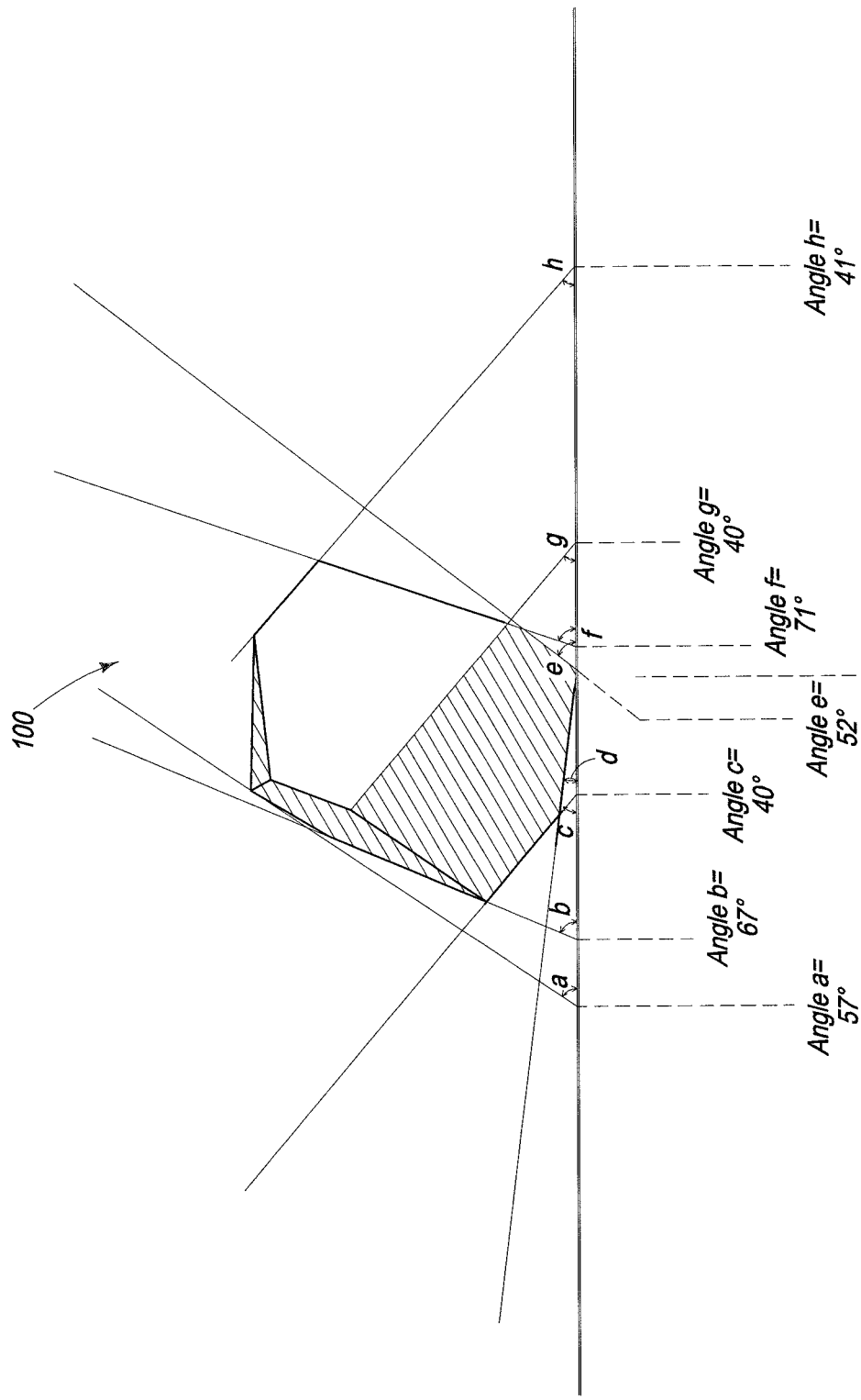
FIG. 5 shows the polyhedron as in FIG. 7 from a perspective corresponding to a perspective seen in *Melencolia I* by Albrecht Dürer.
Figure 6:
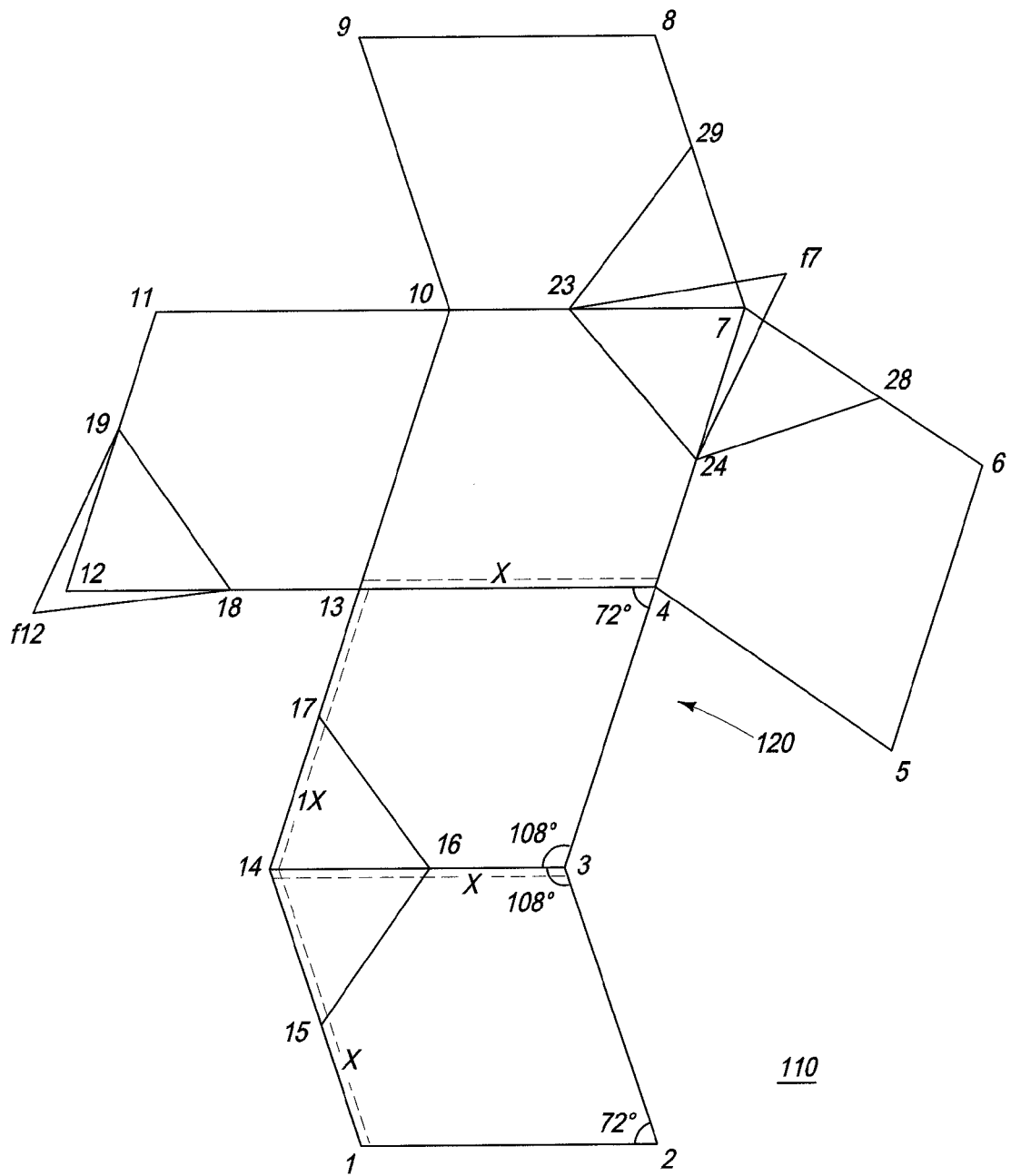
FIG. 6 shows a polyhedral net according to an embodiment, the polyhedral net having a value of D=72 degrees and Y=1.
Figure 7:
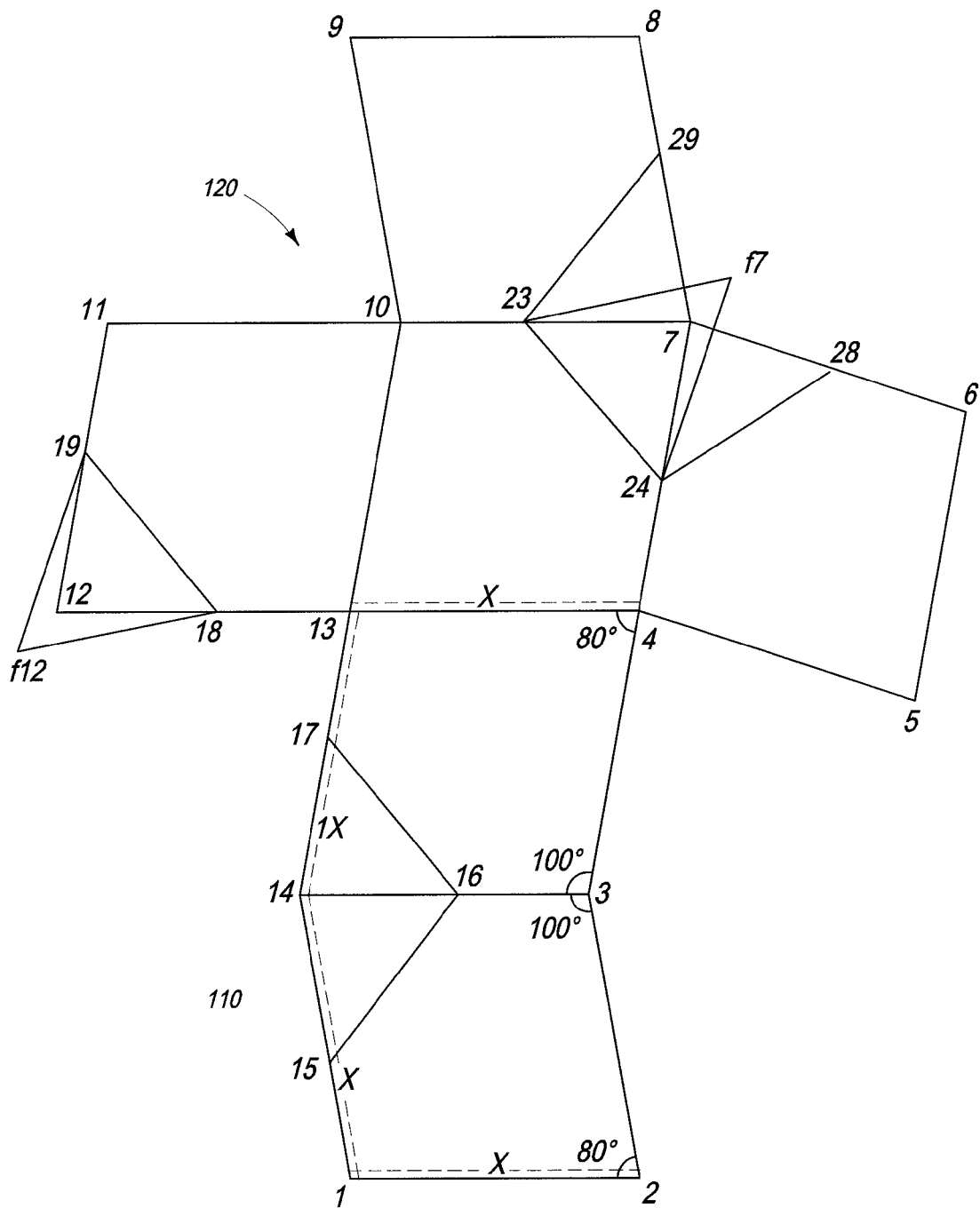
FIG. 7 shows a polyhedral net according to an embodiment, the polyhedral net having a value of D=80 degrees and Y=1.

FIGS. 3 through 5 show polyhedrons (100) created using the above-described method. The polyhedron (100) shown in FIG. 3 has a value of D=80 degrees and Y=0.8. The polyhedron (100) shown in FIG. 5 from a slightly different angle, corresponding generally to a perspective seen in *Melencolia I* by Albrecht Dürer, is the rhombohedron with values of D=80 degrees and Y=1. The rhombohedron (100) shown in FIG. 4 has a value of D=72 degrees and Y=1.

By performing the mathematical steps above, various mathematical lessons may be taught/learned, including lessons relating to algebra, trigonometry, and geometry.

Various science lessons may be taught/learned as well, such as determining a volume of the polyhedron (100), determining how forces would be transferred through the polyhedron (100), etc. Various loads may be positioned upon the polyhedrons (100) to aid in understanding force transfer and load abilities/limits. In doing this, the polyhedrons (100) may be different sizes or may be constructed from different foldable material (110).

Further, art lessons may be taught/learned by following the steps above, including mechanical drafting lessons, perspective lessons, and others.

The above-described processes, and portions thereof, may be performed by software, hardware, and combinations of software and hardware. These processes and portions can be performed by computers, computer-type devices, workstations, processors, micro-processors, other electronic searching tools and memory and other storage-type devices associated therewith. The processes and portions can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

Figure 8:
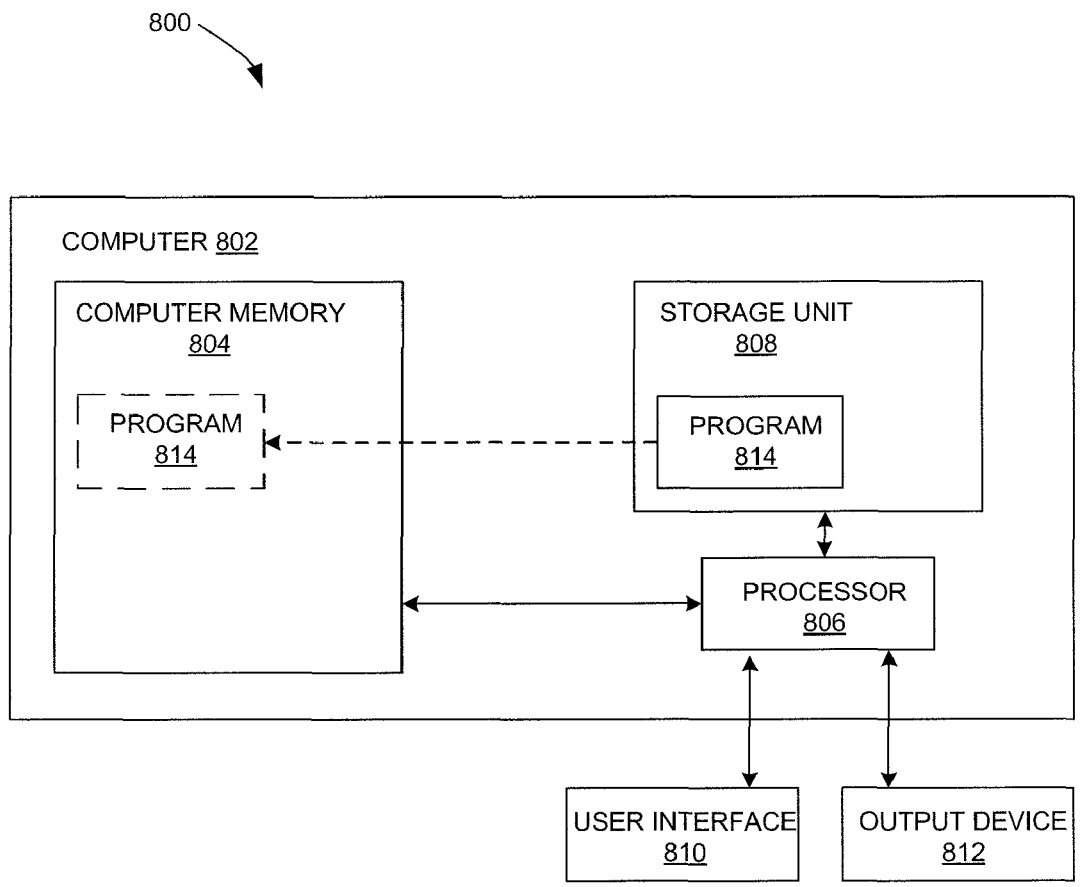
FIG. 8 shows an exemplary system for creating polyhedral nets and polyhedrons.

FIG. 8 illustrates an exemplary system (800) for implementing the methods set forth above. System (800) has a computer (802) with computer memory (804), a processor (806), a storage unit (808), a user interface (810), and an output device (812). Storage unit (808) may be, for example, a disk drive that stores programs and data of computer (802). Storage unit (808) is illustratively shown storing a program (814) embodying the steps and methods set forth above. It should be understood that the program (814) could be broken into subprograms and stored in storage units of separate computers and that data could be transferred between those storage units (the transfer of data is known in the art). A dashed outline within computer memory (804) represents software program (814) loaded into memory (804) and executed by processor (806), and a dashed line between storage unit (808) and computer memory (804) illustrates the transfer of program (814) between storage unit (808) and computer memory (804).

In executing the program (814), interface (810) may be used to input data (e.g., angles and distances) and the steps set forth above may be completed electronically (i.e., in the processor (806)), and the results may be stored in the storage unit (808). If a user does not input data (e.g., through interface (810)), the program (814) may generate random values for the data. In addition, the results may be output through the output device (812) (e.g., a printer, computer screen, etc.), either in part or in whole. In other words, a portion of the polyhedra (100) and/or net (120) may be output on a display (812) or through a printer (812), or the entire polyhedra (100) or net (120) may be output on a display (812) or through a printer (812). It should be clear from the description above that different sections of the polyhedral nets may be stored or output separately or intact, and that polyhedral nets printed out (whether in separate portions or intact) may be connected together to construct a polyhedron.

The processes (methods) and systems, including components thereof, have been described herein as exemplary, whereby specific steps and their order can be omitted and/or changed by persons of ordinary skill in the art to reduce these embodiments to practice without undue experimentations. The processes (methods) and systems have been described in a manner sufficient to enable persons of ordinary skill in the art to readily adapt other hardware and software as may be needed to reduce any of the embodiments to practice without undue experimentation and using conventional techniques.

Those skilled in the art appreciate that variations from the specified embodiments disclosed above are contemplated herein. The description should not be restricted to the above embodiments, but should be measured by the following claims.

What is claimed is:

1. A method of producing faces of a truncated polyhedron, the method comprising the steps of:
    providing a flat piece of foldable material;
    defining an orthogonal coordinate system on the material, the coordinate system having a horizontal axis, a vertical axis, and an origin;
    selecting values for line distances that are greater than zero;
    selecting values for angles between lines having the line distances, the angles being between 0 and 180 degrees;
    selecting values between zero and one, inclusive, for truncating constants;
    drawing the lines, points, and fold lines on the foldable material in accord with the line distances and angles;

defining the value of each truncating constant being less than or equal to one minus another truncating constant on a respective line that will form a single edge of the polyhedron;

marking new points along the lines at distances defined by the truncating constants;

connecting the new points, whereby forming new fold lines and new triangles;

verifying the distances of the new fold lines mathematically; and modifying the new triangles to define a perimeter;

wherein at least a portion of the method is accomplished electronically using a system having a computer with computer memory, a processor, a storage unit, a user interface, an output device, and a program with instructions corresponding to at least a portion of the method.

2. The method of claim 1, further comprising the steps:

cutting around the perimeter;

folding the fold lines; and securing portions of the perimeter together to form the polyhedron.

3. The method of claim 1, wherein at least one of the new triangles is unaffected by the modifying step.

4. A system for constructing a three dimensional hexahedron, the system having a computer with computer memory, a processor, a storage unit, a user interface, an output device, and a program causing the processor to:

provide an electrical representation of a flat piece of foldable material;

define an orthogonal coordinate system on the material, the coordinate system having a horizontal axis denoted ($\alpha$), a vertical axis denoted ($\beta$), and an origin denoted (1);

input a value for a distance (X) that is greater than zero from the user interface;

input a value for a constant (Y) that is greater than zero from the user interface;

multiply the distance value (X) by the constant (Y) to obtain a distance value (XY);

input a value for an angle (D) that is between, but not including, 0 and 180 degrees from the user interface;

draw a line along ($\alpha$) from the origin (1) to a new point (2) that is the distance (X) from the origin (1), whereby forming a line (1)-(2);

continue the line from the point (2) at an angle of (180–D) degrees from ($\alpha$) to a new point (3) that is the distance (X) from the point (2), whereby forming a line (2)-(3);

continue the line from the point (3) at the angle of (D) degrees from ($\alpha$) to a new point (4) that is the distance (XY) from the point (3), whereby forming a line (3)-(4);

continue the line from the point (4) at an angle of (–[180–2D]) degrees from ($\alpha$) to new point (5) that is the distance (XY) from the point (4), whereby forming a line (4)-(5);

continue the line from the point (5) at an angle of (D) degrees from ($\alpha$) to a new point (6) that is the distance (X) from the point (5), whereby forming a line (5)-(6);

continue the line from the point (6) at an angle of (2D) degrees from ($\alpha$) a new point (7) that is the distance (XY) from the point (6), whereby forming a line (6)-(7);

continue the line from the point (7) at an angle of (180–D) degrees from ($\alpha$) to a new point (8) that is the distance (XY) from the point (7), whereby forming a line (7)-(8);

continue the line from the point (8) at an angle of 180 degrees from ($\alpha$) to a new point (9) that is the distance (X) from the point (8), whereby forming a line (8)-(9);

continue the line from the point (9) at an angle of (–D) degrees from ($\alpha$) to a new point (10) that is the distance (XY) from the point (9), whereby forming a line (9)-(10);

continue the line from the point (10) at an angle of 180 degrees from ($\alpha$) to a new point (11) that is the distance (XY) from the point (10), whereby forming a line (10)-(11);

continue the line from the point (11) at an angle of (–[180–D]) degrees from ($\alpha$) to a new point (12) that is the distance (X) from the point (11), whereby forming a line (11)-(12);

continue the line from the point (12) at an angle of 0 degrees from ($\alpha$) to a new point (13) that is the distance (XY) from the point (12), whereby forming a line (12)-(13);

continue the line from the point (13) at an angle of (–[180–D]) degrees from ($\alpha$) to a new point (14) that is the distance (XY) from the point (13), whereby forming a line (13)-(14);

continue the line from the point (14) at an angle of (–D) degrees from ($\alpha$) to the origin (1) that is the distance (X) from the point (14), whereby forming a line (14)-(1);

connect the point (14) to the point (3), whereby forming a fold line (3)-(14);

connect the point (13) to the point (4), whereby forming a fold line (4)-(13);

connect the point (13) to the point (10), whereby forming a fold line (10)-(13);

connect the point (10) to the point (7), whereby forming a fold line (7)-(10);

connect the point (4) to the point (7), whereby forming a fold line (4)-(7);

cut along the following lines: (1)-(2), (2)-(3), (3)-(4), (4)-(5), (5)-(6), (6)-(7), (7)-(8), (8)-(9), (9)-(10), (10)-(11), (11)-(12), (12)-(13), (13)-(14), (14)-(1);

fold along the fold lines (3)-(14), (4)-(13), (10)-(13), (7)-(10), and (4)-(7) to begin to form a polyhedron, all of the fold lines being located on an exterior surface of the polyhedron;

secure the line (7)-(8) to the line (7)-(6), whereby forming a polyhedral edge ((7)-(8))-((6)-(7));

secure the line (9)-(10) to the line (10)-(11), whereby forming a polyhedral edge ((9)-(10))-((10)-(11));

secure the line (4)-(5) to the line (3)-(4), whereby forming a polyhedral edge ((4)-(5))-((3) -(4));

secure the line (12)-(13) to the line (13)-(14), whereby forming a polyhedral edge ((12)-(13))-((13)-(14));

secure the line (2)-(3) to the line (5)-(6), whereby forming a polyhedral edge ((2)-(3))-((5) -(6));

secure the line (1)-(2) to the line (8)-(9), whereby forming a polyhedral edge ((1)-(2))-((8) -(9)); and secure the line (1)-(14) to the line (11)-(12), whereby forming a polyhedral edge ((1)-(14))-((11)-(12)).

5. A system for producing a plurality of polyhedron nets for a truncated polyhedron, the system having a computer with computer memory, a processor, a storage unit, a user interface, an output device, and a program with instructions for causing the processor to:

provide an electrical representation of a flat piece of foldable material;

define an orthogonal coordinate system on the material, the coordinate system having a horizontal axis denoted ($\alpha$), a vertical axis denoted ($\beta$), and an origin denoted (1);

input a value for a distance (X) from the user interface that is greater than zero;

input a value for a constant (Y) from the user interface that is greater than zero;

input values from the user interface equal to or greater than zero and equal to or less than one for the truncating constants ($Z_1$), ($Z_2$), ($Z_3$), ($Z_4$), ($Z_5$), ($Z_6$), ($Z_7$), ($Z_8$), ($Z_9$), ($Z_{11}$), ($Z_{12}$), ($Z_{13}$), ($Z_{14}$), ($Z_{15}$), ($Z_{16}$), ($Z_{17}$), ($Z_{18}$), ($Z_{19}$), ($Z_{20}$), ($Z_{21}$), ($Z_{22}$), ($Z_{23}$), ($Z_{24}$), ($Z_{25}$);

the value for the truncating constant ($Z_7$) being less than or equal to: one minus the truncating constant ($Z_6$);

the value for the truncating constant ($Z_{11}$) being less than or equal to: one minus the truncating constant ($Z_8$);

the value for the truncating constant ($Z_{13}$) being less than or equal to: one minus the truncating constant ($Z_2$);

the value for the truncating constant ($Z_{14}$) being less than or equal to: one minus the truncating constant ($Z_9$);

the value for the truncating constant ($Z_{16}$) being less than or equal to: one minus the truncating constant ($Z_1$);

the value for the truncating constant ($Z_{17}$) being less than or equal to: one minus the truncating constant ($Z_5$);

the value for the truncating constant ($Z_{19}$) being less than or equal to: one minus the truncating constant ($Z_{12}$);

the value for the truncating constant ($Z_{20}$) being less than or equal to: one minus the truncating constant ($Z_4$);

the value for the truncating constant ($Z_{22}$) being less than or equal to: one minus the truncating constant ($Z_{15}$);

the value for the truncating constant ($Z_{23}$) being less than or equal to: one minus the truncating constant ($Z_{21}$);

the value for the truncating constant ($Z_{24}$) being less than or equal to: one minus the truncating constant ($Z_{18}$);

the value for the truncating constant ($Z_{25}$) being less than or equal to: one minus the truncating constant ($Z_3$);

input a value from the user interface for an angle (D) that is between, but not including, 0 and 180 degrees;

draw a line along ($\alpha$) from the origin (1) to a new point (2) that is the distance (X) from the origin (1), whereby forming a line (1)-(2);

continue the line from the point (2) at an angle of (180−D) degrees from ($\alpha$) to a new point (3) that is the distance (X) from the point (2), whereby forming a line (2)-(3);

continue the line from the point (3) at the angle of (D) degrees from ($\alpha$) to a new point (4) that is the distance (XY) from the point (3), whereby forming a line (3)-(4);

continue the line from the point (4) at an angle of (−[180−2D]) degrees from ($\alpha$) to new point (5) that is the distance (XY) from the point (4), whereby forming a line (4)-(5);

continue the line from the point (5) at an angle of (D) degrees from ($\alpha$) to a new point (6) that is the distance (X) from the point (5), whereby forming a line (5)-(6);

continue the line from the point (6) at an angle of (2D) degrees from ($\alpha$) a new point (7) that is the distance (XY) from the point (6), whereby forming a line (6)-(7);

continue the line from the point (7) at an angle of (180−D) degrees from ($\alpha$) to a new point (8) that is the distance (XY) from the point (7), whereby forming a line (7)-(8);

continue the line from the point (8) at an angle of 180 degrees from ($\alpha$) to a new point (9) that is the distance (X) from the point (8), whereby forming a line (8)-(9);

continue the line from the point (9) at an angle of (−D) degrees from ($\alpha$) to a new point (10) that is the distance (XY) from the point (9), whereby forming a line (9)-(10);

continue the line from the point (10) at an angle of 180 degrees from ($\alpha$) to a new point (11) that is the distance (XY) from the point (10), whereby forming a line (10)-(11);

continue the line from the point (11) at an angle of (−[180−D]) degrees from ($\alpha$) to a new point (12) that is the distance (X) from the point (11), whereby forming a line (11)-(12);

continue the line from the point (12) at an angle of 0 degrees from ($\alpha$) to a new point (13) that is the distance (XY) from the point (12), whereby forming a line (12)-(13);

continue the line from the point (13) at an angle of (−[180−D]) degrees from ($\alpha$) to a new point (14) that is the distance (XY) from the point (13), whereby forming a line (13)-(14);

continue the line from the point (14) at an angle of (−D) degrees from ($\alpha$) to the origin (1) that is the distance (X) from the point (14), whereby forming a line (14)-(1);

connect the point (14) to the point (3), whereby forming a fold line (3)-(14);

connect the point (13) to the point (4), whereby forming a fold line (4)-(13);

connect the point (13) to the point (10), whereby forming a fold line (10)-(13);

connect the point (10) to the point (7), whereby forming a fold line (7)-(10);

connect the point (4) to the point (7), whereby forming a fold line (4)-(7);

mark a point (15) along line (14)-(1), the point (15) being a distance ($Z_1X$) from the point (14);

mark a point (19) along line (11)-(12), the point (19) being the distance ($Z_1X$) from the point (12);

mark a point (16) along the fold line (3)-(14), the point (16) being a distance ($Z_2X$) from the point (14);

mark a point (17) along the line (13)-(14), the point (17) being a distance ($Z_3XY$) from the point (14);

mark a point (18) along the line (12)-(13), the point (18) being the distance ($Z_3XY$) from the point (12);

mark a point (23) along the fold line (7)-(10), the point (23) being a distance ($Z_4X$) from the point (7);

mark a point (24) along the fold line (4)-(7), the point (24) being a distance ($Z_5X$) from the point (7);

mark a point (28) along the line (6)-(7), the point (28) being a distance ($Z_6XY$) from the point (7);

mark a point (29) along the line (7)-(8), the point (29) being the distance ($Z_6XY$) from the point (7);

mark a point (27) along the line (6)-(7), the point (27) being a distance ($Z_7XY$) from the point (6);

mark a point (20) along the line (7)-(8), the point (20) being the distance ($Z_7XY$) from the point (8);

mark a point (31) along the line (5)-(6), the point (31) being a distance ($Z_8X$) from the point (6);

mark a point (32) along the line (2)-(3), the point (32) being the distance ($Z_8X$) from the point (2);

mark a point (33) along the line (8)-(9), the point (33) being a distance ($Z_9X$) from the point (8);

mark a point (34) along the line (1)-(2), the point (34) being the distance ($Z_9X$) from the point (2);

mark a point (59) along the line (5)-(6), the point (59) being a distance ($Z_{11}X$) from the point (5);

mark a point (35) along the line (2)-(3), the point (35) being the distance ($Z_{11}X$) from the point (3);

mark a point (36) along the line (3)-(4), the point (36) being a distance ($Z_{12}XY$) from the point (3);

mark a point (37) along the line (4)-(5), the point (37) being the distance ($Z_{12}XY$) from the point (5);

mark a point (38) along the fold line (3)-(14), the point (38) being a distance ($Z_{13}X$) from the point (3);

mark a point (39) along the line (1)-(2), the point (39) being a distance ($Z_{14}X$) from the point (1);

mark a point (41) along the line (8)-(9), the point (41) being the distance ($Z_{14}X$) from the point (9);
mark a point (42) along the line (9)-(10), the point (42) being a distance ($Z_{15}XY$) from the point (9);
mark a point (43) along the line (10)-(11), the point (43) being the distance ($Z_{15}XY$) from the point (11);
mark a point (44) along the line (11)-(12), the point (44) being a distance ($Z_{16}X$) from the point (11);
mark a point (45) along the line (14)-(1), the point (45) being the distance ($Z_{16}X$) from the point (1);
mark a point (46) along the fold line (4)-(7), the point (46) being a distance ($Z_{17}X$) from the point (4);
mark a point (47) along the fold line (4)-(13), the point (47) being a distance ($Z_{18}X$) from the point (4);
mark a point (48) along the line (3)-(4), the point (48) being a distance ($Z_{19}XY$) from the point (4);
mark a point (49) along the line (4)-(5), the point (49) being the distance ($Z_{19}XY$) from the point (4);
mark a point (51) along the fold line (7)-(10), the point (51) being a distance ($Z_{20}X$) from the point (10);
mark a point (52) along the fold line (10)-(13), the point (52) being a distance ($Z_{21}X$) from the point (10);
mark a point (53) along the line (9)-(10), the point (53) being a distance ($Z_{22}XY$) from the point (10);
mark a point (54) along the line (10)-(11), the point (54) being a distance ($Z_{22}XY$) from the point (10);
mark a point (55) along the fold line (10)-(13), the point (55) being a distance ($Z_{23}X$) from the point (13);
mark a point (56) along the fold line (4)-(13), the point (56) being a distance ($Z_{24}X$) from the point (13);
mark a point (57) along the line (12)-(13), the point (57) being a distance ($Z_{25}XY$) from the point (13);
mark a point (58) along the line (13)-(14), the point (58) being the distance ($Z_{25}XY$) from the point (13);
connect the point (15) to the point (16), whereby forming a fold line (15)-(16) and a triangle (14)-(15)-(16);
connect the point (16) to the point (17), whereby forming a fold line (16)-(17) and a triangle (14)-(16)-(17);
connect the point (56) to the point (58), whereby forming a fold line (56)-(58) and a triangle (13)-(56)-(58);
connect the point (55) to the point (56), whereby forming a fold line (55)-(56) and a triangle (13)-(55)-(56);
connect the point (55) to the point (57), whereby forming a fold line (55)-(57) and a triangle (13)-(55)-(57);
connect the point (18) to the point (19), whereby forming a fold line (18)-(19) and a triangle (12)-(18)-(19);
connect the point (43) to the point (44), whereby forming a fold line (43)-(44) and a triangle (11)-(43)-(44);
connect the point (52) to the point (54), whereby forming a fold line (52)-(54) and a triangle (10)-(52)-(54);
connect the point (51) to the point (52), whereby forming a fold line (51)-(52) and a triangle (10)-(51)-(52);
connect the point (51) to the point (53), whereby forming a fold line (51)-(53) and a triangle (10)-(51)-(53);
connect the point (41) to the point (42), whereby forming a fold line (41)-(42) and a triangle (9)-(41)-(42);
connect the point (20) to the point (33), whereby forming a fold line (20)-(33) and a triangle (8)-(20)-(33);
connect the point (23) to the point (29), whereby forming a fold line (23)-(29) and a triangle (7)-(23)-(29);
connect the point (23) to the point (24), whereby forming a fold line (23)-(24) and a triangle (7)-(23)-(24);
connect the point (24) to the point (28), whereby forming a fold line (24)-(28) and a triangle (7)-(24)-(28);
connect the point (27) to the point (31), whereby forming a fold line (27)-(31) and a triangle (6)-(27)-(31);
connect the point (37) to the point (59), whereby forming a fold line (37)-(59) and a triangle (5)-(37)-(59);
connect the point (46) to the point (49), whereby forming a fold line (46)-(49) and a triangle (4)-(46)-(49);
connect the point (46) to the point (47), whereby forming a fold line (46)-(47) and a triangle (4)-(46)-(47);
connect the point (47) to the point (48), whereby forming a fold line (47)-(48) and a triangle (4)-(47)-(48);
connect the point (36) to the point (38), whereby forming a fold line (36)-(38) and a triangle (3)-(36)-(38);
connect the point (35) to the point (38), whereby forming a fold line (35)-(38) and a triangle (3)-(35)-(38);
connect the point (32) to the point (34), whereby forming a fold line (32)-(34) and a triangle (2)-(32)-(34);
connect the point (39) to the point (45), whereby forming a fold line (39)-(45) and a triangle (1)-(39)-(45);
verify that the fold line (24)-(28) has a distance of $\sqrt{[(Z_6XY)^2+(Z_5X)^2-2(Z_5Z_6X^2Y\cos(D))]}$;
verify that the fold line (23)-(29) has a distance of $\sqrt{[(Z_6XY)^2+(Z_4X)^2-2(Z_4Z_6X^2Y\cos(D))]}$;
verify that the fold line (23)-(24) has a distance of $\sqrt{[(Z_5X)^2+(Z_4X)^2-2(Z_4Z_5X^2\cos(D))]}$;
modify a triangle selected from the group consisting of the (7)-(23)-(24) triangle, the (7)-(23)-(29) triangle, and the (7)-(24)-(28) triangle;
verify that the fold line (46)-(47) has a distance of $\sqrt{[(Z_{17}X)^2+(Z_{18}X)^2-2(Z_{17}Z_{18}X^2\cos(180-D))]}$;
verify that the fold line (46)-(49) has a distance of $\sqrt{[(Z_{17}X)^2+(Z_{19}XY)^2-2(Z_{17}Z_{19}X^2Y\cos(180-D))]}$;
verify that the fold line (47)-(48) has a distance of $\sqrt{[(Z_{19}XY)^2+(Z_{18}X)^2-2(Z_{18}Z_{19}X^2Y\cos(D))]}$;
modify a triangle selected from the group consisting of the (4)-(46)-(47) triangle, the (4)-(46)-(49) triangle, and the (4)-(47)-(48) triangle;
verify that the fold line (37)-(59) has a distance of $\sqrt{[(Z_{12}XY)^2+(Z_{11}X)^2-2(Z_{11}Z_{12}X^2Y\cos(D))]}$;
verify that the fold line (36)-(38) has a distance of $\sqrt{[(Z_{12}XY)^2+(Z_{13}X)^2-2(Z_{12}Z_{13}X^2Y\cos(180-D))]}$;
verify that the fold line (35)-(38) has a distance of $\sqrt{[(Z_{13}X)^2+(Z_{11}X)^2-2(Z_{11}Z_{13}X^2\cos(180-D))]}$;
modify a triangle selected from the group consisting of the (5)-(37)-(59) triangle, the (3)-(36)-(38) triangle, and the (3)-(35)-(38) triangle;
verify that the fold line (27)-(31) has a distance of $\sqrt{[(Z_7XY)^2+(Z_8X)^2-2(Z_7Z_8X^2Y\cos(180-D))]}$;
verify that the fold line (20)-(33) has a distance of $\sqrt{[(Z_7XY)^2+(Z_9X)^2-2(Z_7Z_9X^2Y\cos(180-D))]}$;
verify that the fold line (32)-(34) has a distance of $\sqrt{[(Z_8X)^2+(Z_9X)^2-2(Z_8Z_9X^2\cos(D))]}$;
modify a triangle selected from the group consisting of the (6)-(27)-(31) triangle, the (8)-(20)-(33) triangle, and the (2)-(32)-(34) triangle;
verify that the fold line (39)-(45) has a distance of $\sqrt{[(Z_{14}X)^2+(Z_{16}X)^2-2(Z_{14}Z_{16}X^2\cos(180-D))]}$;
verify that the fold line (43)-(44) has a distance of $\sqrt{[(Z_{15}XY)^2+(Z_{16}X)^2-2(Z_{15}Z_{16}X^2\cos(180-D))]}$;
verify that the fold line (41)-(42) has a distance of $\sqrt{[(Z_{14}X)^2+(Z_{15}XY)^2-2(Z_{14}Z_{15}X^2Y\cos(D))]}$;
modify a triangle selected from the group consisting of the (1)-(39)-(45) triangle, the (11)-(43)-(44) triangle, and the (9)-(41)-(42) triangle;
verify that the fold line (15)-(16) has a distance of $\sqrt{[(Z_1X)^2+(Z_2X)^2-2(Z_1Z_2X^2\cos(D))]}$;
verify that the fold line (16)-(17) has a distance of $\sqrt{[(Z_3XY)^2+(Z_2X)^2-2(Z_2Z_3X^2Y\cos(D))]}$;
verify that the fold line (18)-(19) has a distance of $\sqrt{[(Z_1X)^2+(Z_3XY)^2-2(Z_1Z_3X^2Y\cos(D))]}$;

modify a triangle selected from the group consisting of the (12)-(18)-(19) triangle, the (14)-(16)-(17) triangle, and the (14)-(15)-(16) triangle;

verify that the fold line (55)-(57) has a distance of $\sqrt{[(Z_3XY)^2+(Z_{23}X)^2-2(Z_{23}Z_{25}X^2Y\cos(180-D))]}$;

verify that the fold line (56)-(58) has a distance of $\sqrt{[(Z_{25}XY)^2+(Z_{24}X)^2-2(Z_{24}Z_{25}X^2Y\cos(180-D))]}$;

verify that the fold line (55)-(56) has a distance of $\sqrt{[(Z_{24}X)^2+(Z_{23}X)^2-2(Z_{23}Z_{24}X^2\cos(D))]}$;

modify a triangle selected from the group consisting of the (13)-(55)-(57) triangle, the (13)-(55)-(56) triangle, and the (13)-(56)-(58) triangle;

verify that the fold line (51)-(53) has a distance of $\sqrt{[(Z_{22}XY)2+(Z_{20}X)^2-2(Z_{20}Z_{22}X^2Y\cos(180-D))]}$;

verify that the fold line (51)-(52) has a distance of $\sqrt{[(Z_{21}X)^2+(Z_{20}X)^2-2(Z_{20}Z_{21}X^2\cos(180-D))]}$;

verify that the fold line (52)-(54) has a distance of $\sqrt{[(Z_{21}X)^2+(Z_{22}XY)^2-2(Z_{21}Z_{22}X^2Y\cos(D))]}$; and modify a triangle selected from the group consisting of the (10)-(51)-(53) triangle, the (10)-(52)-(54) triangle, and the (10)-(51)-(52) triangle.

6. The system of claim 5, wherein:

modifying the (7)-(23)-(24) triangle includes marking a point (f7) being equal to a distance of the fold line (24)-(28) away from the point (24) and being equal to a distance of the fold line (23)-(29) away from the point (23), whereby creating a triangle (f7)-(23)-(24);

modifying the (7)-(23)-(29) triangle includes marking a point (f7) being equal to a distance of the fold line (24)-(28) away from the point (29) and being equal to a distance of the fold line (23)-(24) away from the point (23), whereby creating a triangle (f7)-(23)-(29);

modifying the (7)-(24)-(28) triangle includes marking a point (f7) being equal to a distance of the fold line (23)-(24) away from the point (24) and being equal to a distance of the fold line (23)-(29) away from the point (28), whereby creating a triangle (f7)-(24)-(28);

modifying the (4)-(46)-(47) triangle includes marking a point (f4) being equal to a distance of the fold line (47)-(48) away from the point (47) and being equal to a distance of the fold line (46)-(49) away from the point (46), whereby creating a triangle (f4)-(46)-(47);

modifying the (4)-(46)-(49) triangle includes marking a point (f4) being equal to a distance of the fold line (47)-(48) away from the point (49) and being equal to a distance of the fold line (46)-(47) away from the point (46), whereby creating a triangle (f4)-(46)-(49);

modifying the (4)-(47)-(48) triangle includes marking a point (f4) being equal to a distance of the fold line (47)-(48) away from the point (47) and being equal to a distance of the fold line (46)-(49) away from the point (48), whereby creating a triangle (f4)-(47)-(48);

modifying the (5)-(37)-(59) triangle includes marking a point (f5) being equal to a distance of the fold line (36)-(38) away from the point (37) and being equal to a distance of the fold line (35)-(38) away from the point (59), whereby creating a triangle (f5)-(37)-(59);

modifying the (3)-(36)-(38) triangle includes marking a point (f5) being equal to a distance of the fold line (37)-(59) away from the point (36) and being equal to a distance of the fold line (35)-(38) away from the point (38), whereby creating a triangle (f5)-(36)-(38);

modifying the (3)-(35)-(38) triangle includes marking a point (f5) being equal to a distance of the fold line (37)-(59) away from the point (35) and being equal to a distance of the fold line (36)-(38) away from the point (38), whereby creating a triangle (f5)-(35)-(38);

modifying the (6)-(27)-(31) triangle includes marking a point (f6) being equal to a distance of the fold line (20)-(33) away from the point (27) and being equal to a distance of the fold line (32)-(34) away from the point (31), whereby creating a triangle (f6)-(27)-(31);

modifying the (8)-(20)-(33) triangle includes marking a point (f6) being equal to a distance of the fold line (32)-(34) away from the point (33) and being equal to a distance of the fold line (27)-(31) away from the point (20), whereby creating a triangle (f6)-(20)-(33);

modifying the (2)-(32)-(34) triangle includes marking a point (f6) being equal to a distance of the fold line (27)-(31) away from the point (32) and being equal to a distance of the fold line (20)-(33) away from the point (34), whereby creating a triangle (f6)-(32)-(34);

modifying the (1)-(39)-(45) triangle includes marking a point (f1) being equal to a distance of the fold line (41)-(42) away from the point (39) and being equal to a distance of the fold line (43)-(44) away from the point (45), whereby creating a triangle (f1)-(39)-(45);

modifying the (11)-(43)-(44) triangle includes marking a point (f1) being equal to a distance of the fold line (39)-(45) away from the point (44) and being equal to a distance of the fold line (41)-(42) away from the point (43), whereby creating a triangle (f1)-(43)-(44);

modifying the (9)-(41)-(42) triangle includes marking a point (f1) being equal to a distance of the fold line (43)-(44) away from the point (42) and being equal to a distance of the fold line (39)-(45) away from the point (41), whereby creating a triangle (f1)-(41)-(42);

modifying the (12)-(18)-(19) triangle includes marking a point (f12) being equal to a distance of the fold line (15)-(16) away from the point (19) and being equal to a distance of the fold line (16)-(17) away from the point (18), whereby creating a triangle (f12)-(18)-(19);

modifying the (14)-(16)-(17) triangle includes marking a point (f12) being equal to a distance of the fold line (18)-(19) away from the point (17) and being equal to a distance of the fold line (15)-(16) away from the point (16), whereby creating a triangle (f12)-(16)-(17);

modifying the (14)-(15)-(16) triangle includes marking a point (f12) being equal to a distance of the fold line (16)-(17) away from the point (16) and being equal to a distance of the fold line (18-(19) away from the point (15), whereby creating a triangle (f12)-(15)-(16);

modifying the (13)-(55)-(57) triangle includes marking a point (f13) being equal to a distance of the fold line-(56)-(58) away from the point (57) and being equal to a distance of the fold line (55)-(57) away from the point (55), whereby creating a triangle (f13)-(55)-(57);

modifying the (13)-(55)-(56) triangle includes marking a point (f13) being equal to a distance of the fold line (55)-(57) away from the point (55) and being equal to a distance of the fold line (56)-(58) away from the point (56), whereby creating a triangle (f13)-(55)-(56);

modifying the (13)-(56)-(58) triangle includes marking a point (f13) being equal to a distance of the fold line (55)-(57) away from the point (58) and being equal to a distance of the fold line (55)-(56) away from the point (56), whereby creating a triangle (f13)-(56)-(58);

modifying the (10)-(51)-(53) triangle includes marking a point (f10) being equal to a distance of the fold line (52)-(54) away from the point (53) and being equal to a distance of the fold line (51)-(52) away from the point (51), whereby creating a triangle (f10)-(51)-(53);

modifying the (10)-(52)-(54) triangle includes marking a point (f10) being equal to a distance of the fold line (51)-(53) away from the point (54) and being equal to a distance of the fold line (51)-(52) away from the point (52), whereby creating a triangle (f10)-(52)-(54); and modifying the (10)-(51)-(52) triangle includes marking a point (f10) being equal to a distance of the fold line (51)-(53) away from the point (51) and being equal to a distance of the fold line (52)-(54) away from the point (52), whereby creating a triangle (f10)-(51)-(52).

7. The system of claim 6, wherein:

(Y)=0.8;
$(Z_1)=(Z_2)=0.53$;
$(Z_3)=(Z_4)=(Z_5)=(Z_6)=0.6$;
$(Z_7)=(Z_8)=(Z_9)=(Z_{11})=(Z_{12})=(Z_{13})=(Z_{14})=(Z_{15})=0$;
$(Z_{16})=(Z_{17})=(Z_{18})=(Z_{19})=(Z_{20})=(Z_{21})=(Z_{22})=(Z_{23})=(Z_{24})=(Z_{25})=0$;
D=80 degrees;

a point (25) is marked along the fold line (24)-(28) at a distance of 0.6(X) from the point (24);

a point (26) is marked along the line (5)-(6) at a distance of 0.86(X) from the point (5);

the point (25) is connected to the point (26), whereby creating a fold line (25)-(26);

a point (22) is marked along the fold line (23)-(29) at the distance of 0.6(X) from the point (23);

a point (21) is marked along the line (8)-(9) at the distance of 0.86(X) from the point (9);

the point (21) is connected to the point (22), whereby creating a fold line (21)-(22);

a point (50) is marked at a midpoint of the fold line (1)-(3);

the point (2) is connected to the point (50), whereby creating a line (2)-(50) which is perpendicular to the fold line (1)-(3);

a point (2f) is marked along the line (2)-(50), the point (2f) being the distance of 0.8(X) from the point (1) and the distance of 0.86(X) from the point (3);

a new triangle, (1)-(2f)-(3), is created with the points (1), (2f), and (3);

the triangle (12)-(18)-(19) is modified to form the triangle (f12)-(18)-(19); and the polyhedron nets correspond to a three dimensional polyhedra seen in *Melencolia I* by Albrecht Dürer.

8. A method of producing a three dimensional polyhedra, the method comprising the steps of:

providing a flat piece of foldable material;

defining an orthogonal coordinate system on the material, the coordinate system having a horizontal axis denoted ($\alpha$), a vertical axis denoted ($\beta$), and an origin denoted (1);

selecting a value for a distance (X) that is greater than zero;

selecting a value for a constant (Y) equal to 0.8;

allowing truncating constants ($Z_1$) and ($Z_2$) to equal 0.53;

allowing truncating constants ($Z_3$), ($Z_4$), ($Z_5$), and ($Z_6$) to equal 0.6;

allowing truncating constants ($Z_7$), ($Z_8$), ($Z_9$), ($Z_{11}$), ($Z_{12}$), ($Z_{13}$), ($Z_{14}$), ($Z_{15}$), ($Z_{16}$), ($Z_{17}$), ($Z_{18}$), ($Z_{19}$), ($Z_{20}$), ($Z_{21}$), ($Z_{22}$), ($Z_{23}$), ($Z_{24}$), and ($Z_{25}$) to equal zero;

selecting a value for an angle (D) equal to 80 degrees;

drawing a line along ($\alpha$) from the origin (1) to a new point (2) that is the distance (x) from the origin (1), whereby forming a line (1)-(2);

continuing the line from the point (2) at an angle of (180−D) degrees from ($\alpha$) to a new point (3) that is the distance (X) from the point (2), whereby forming a line (2)-(3);

continuing the line from the point (3) at the angle of (D) degrees from ($\alpha$) to a new point (4) that is the distance (XY) from the point (3), whereby forming a line (3)-(4);

continuing the line from the point (4) at an angle of (−[180−2D]) degrees from ($\alpha$) to new point (5) that is the distance (XY) from the point (4), whereby forming a line (4)-(5);

continuing the line from the point (5) at an angle of (D) degrees from ($\alpha$) to a new point (6) that is the distance (X) from the point (5), whereby forming a line (5)-(6);

continuing the line from the point (6) at an angle of (2D) degrees from ($\alpha$) a new point (7) that is the distance (XY) from the point (6), whereby forming a line (6)-(7);

continuing the line from the point (7) at an angle of (180−D) degrees from ($\alpha$) to a new point (8) that is the distance (XY) from the point (7), whereby forming a line (7)-(8);

continuing the line from the point (8) at an angle of 180 degrees from ($\alpha$) to a new point (9) that is the distance (X) from the point (8), whereby forming a line (8)-(9);

continuing the line from the point (9) at an angle of (−D) degrees from ($\alpha$) to a new point (10) that is the distance (XY) from the point (9), whereby forming a line (9)-(10);

continuing the line from the point (10) at an angle of 180 degrees from ($\alpha$) to a new point (11) that is the distance (XY) from the point (10), whereby forming a line (10)-(11);

continuing the line from the point (11) at an angle of (−[180−D]) degrees from ($\alpha$) to a new point (12) that is the distance (X) from the point (11), whereby forming a line (11)-(12);

continuing the line from the point (12) at an angle of 0 degrees from ($\alpha$) to a new point (13) that is the distance (XY) from the point (12), whereby forming a line (12)-(13);

continuing the line from the point (13) at an angle of (−[180−D]) degrees from ($\alpha$) to a new point (14) that is the distance (XY) from the point (13), whereby forming a line (13)-(14);

continuing the line from the point (14) at an angle of (−D) degrees from ($\alpha$) to the origin (1) that is the distance (X) from the point (14), whereby forming a line (14)-(1);

connecting the point (14) to the point (3), whereby forming a fold line (3)-(14);

connecting the point (13) to the point (4), whereby forming a fold line (4)-(13);

connecting the point (13) to the point (10), whereby forming a fold line (10)-(13);

connecting the point (10) to the point (7), whereby forming a fold line (7)-(10);

connecting the point (4) to the point (7), whereby forming a fold line (4)-(7);

marking a point (15) along line (14)-(1), the point (15) being a distance ($Z_1X$) from the point (14);

marking a point (19) along line (11)-(12), the point (19) being the distance ($Z_1X$) from the point (12);

marking a point (16) along the fold line (3)-(14), the point (16) being a distance ($Z_2X$) from the point (14);

marking a point (17) along the line (13)-(14), the point (17) being a distance ($Z_3XY$) from the point (14);

marking a point (18) along the line (12)-(13), the point (18) being the distance ($Z_3XY$) from the point (12);

marking a point (23) along the fold line (7)-(10), the point (23) being a distance ($Z_4X$) from the point (7);

marking a point (24) along the fold line (4)-(7), the point (24) being a distance ($Z_5X$) from the point (7);

marking a point (28) along the line (6)-(7), the point (28) being a distance ($Z_6XY$) from the point (7);

marking a point (29) along the line (7)-(8), the point (29) being the distance ($Z_6XY$) from the point (7);

connecting the point (15) to the point (16), whereby forming a fold line (15)-(16) and a triangle (14)-(15)-(16);

connecting the point (16) to the point (17), whereby forming a fold line (16)-(17) and a triangle (14)-(16)-(17);

connecting the point (18) to the point (19), whereby forming a fold line (18)-(19) and a triangle (12)-(18)-(19);

connecting the point (23) to the point (29), whereby forming a fold line (23)-(29) and a triangle (7)-(23)-(29);

connecting the point (23) to the point (24), whereby forming a fold line (23)-(24) and a triangle (7)-(23)-(24);

connecting the point (24) to the point (28), whereby forming a fold line (24)-(28) and a triangle (7)-(24)-(28);

verifying that the fold line (24)-(28) has a distance of $\sqrt{[(Z_6XY)^2+(Z_5X)^2-2(Z_5Z_6X^2Y\cos(D))]}$;

verifying that the fold line (23)-(29) has a distance of $\sqrt{[(Z_6XY)^2+(Z_4X)^2-2(Z_4Z_6X^2Y\cos(D))]}$;

verifying that the fold line (23)-(24) has a distance of $\sqrt{[(Z_5X)^2+(Z_4X)^2-2(Z_4Z_5X^2\cos(D))]}$;

verifying that the fold line (15)-(16) has a distance of $\sqrt{[(Z_1X)^2+(Z_2X)^2-2(Z_1Z_2X^2\cos(D))]}$;

verifying that the fold line (16)-(17) has a distance of $\sqrt{[(Z_3XY)^2+(Z_2X)^2-2(Z_2Z_3X^2Y\cos(D))]}$;

verifying that the fold line (18)-(19) has a distance of $\sqrt{[(Z_1X)^2+(Z_3XY)^2-2(Z_1Z_3X^2Y\cos(D))]}$;

marking a point (25) along the fold line (24)-(28) at a distance of 0.6(X) from the point (24);

marking a point (26) along the line (5)-(6) at a distance of 0.86(X) from the point (5);

connecting the point (25) to the point (26), whereby creating a fold line (25)-(26);

marking a point (22) along the fold line (23)-(29) at the distance of 0.6(X) from the point (23);

marking a point (21) along the line (8)-(9) at the distance of 0.86(X) from the point (9);

connecting the point (21) to the point (22), whereby creating a fold line (21)-(22);

marking a point (50) at a midpoint of the fold line (1)-(3);

connecting the point (2) to the point (50), whereby creating a line (2)-(50) which is perpendicular to the fold line (1)-(3);

marking a point (2f) along the line (2)-(50), the point (2f) being the distance of 0.86(X) from the point (1) and the distance of 0.86(X) from the point (3);

creating a new triangle, (1)-(2f)-(3), with the points (1), (2f), and (3);

folding the fold line (18)-(19);

separating the polyhedron net from excess foldable material by cutting along the following lines: (1)-(2f)-(3)-(4)-(5)-(6)-(7)-(8)-(9)-(10)-(11)-(19)-(12)-(18)-(13)-(14)-(1);

cutting the line (14)-(16);

folding the polyhedron net along the fold lines (23)-(29), (24)-(28), (21)-(22), (25)-(26), (15)-(16), (16)-(17), (18)-(19), (23)-(24), with all of the fold lines being located on an exterior surface of the polyhedron;

securing the line (25)-(26) to the line (21)-(22);

securing the line (9)-(10) to the line (10)-(11);

securing the line (4)-(5) to the line (3)-(4);

securing the line (13)-(18) to the line (13)-(17);

securing the line (2f)-(3) to the line (5)-(26);

securing the line (1)-(2f) to the line (9)-(21);

securing the line (1)-(15) to the line (11)-(19);

securing the line (7)-(28) to the line (7)-(29);

securing the line (7)-(23) to the line (22)-(23); and securing the line (7)-(24) to the line (24)-(25);

wherein at least a portion of the method is accomplished electronically using a system having a computer with computer memory, a processor, a storage unit, a user interface, an output device, and a program with instructions corresponding to at least a portion of the method.

9. The method of claim 8, wherein:

the (12)-(18)-(19) triangle is modified by marking a point (f12) being equal to a distance of the fold line (15)-(16) away from the point (19) and being equal to a distance of the fold line (16)-(17) away from the point (18), whereby creating a triangle (f12)-(18)-(19);

the polyhedron net is separated from the excess foldable material by cutting along the following lines: (1)-(2f)-(3)-(4)-(5)-(6)-(7)-(8)-(9)-(10)-(11)-(19) -(f12)-(18)-(13)-(14)-(1);

the line (f12)-(19) is secured to the line (15)-(16); and the line (f12)-(18) is secured to the line (16)-(17).

10. The method of claim 8, wherein adjacent edges of the (12)-(18)-(19) triangle, the (14)-(16)-(17) triangle, and the (14)-(15)-(17) triangle are secured together to create a pyramid dome.

* * * * *